(12) United States Patent
Iida

(10) Patent No.: US 6,980,324 B1
(45) Date of Patent: Dec. 27, 2005

(54) APPARATUS AND METHOD FOR GENERATING MULTICOLOR IMAGE

(75) Inventor: Masaru Iida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/538,483

(22) Filed: Mar. 30, 2000

(30) Foreign Application Priority Data

Sep. 17, 1999 (JP) .............................. 11-263141

(51) Int. Cl.$^7$ .......................... G06F 15/00; G03F 3/08; G06K 9/00
(52) U.S. Cl. ..................... 358/1.9; 358/518; 382/167
(58) Field of Search ........................ 358/1.9, 532, 530, 358/531, 533, 518, 500, 300, 3.08, 447, 1.2; 382/261, 167, 279, 166, 274, 275, 266, 284, 382/254; 399/46; 712/32; 347/252

(56) References Cited

U.S. PATENT DOCUMENTS

| | | | | |
|---|---|---|---|---|
| 4,630,125 A | * | 12/1986 | Roetling | 358/3.08 |
| 5,212,560 A | * | 5/1993 | Hattori et al. | 358/300 |
| 5,257,120 A | * | 10/1993 | Hirota | 358/443 |
| 5,270,807 A | * | 12/1993 | Ikeda et al. | 358/500 |
| 5,333,038 A | | 7/1994 | Mizoguchi et al. | |
| 5,479,175 A | * | 12/1995 | Cianciosi et al. | 347/252 |
| 5,532,828 A | * | 7/1996 | Mitsuse | 358/3.15 |
| 5,537,495 A | * | 7/1996 | Overton | 382/269 |
| 5,570,432 A | * | 10/1996 | Kojima | 382/254 |
| 5,592,311 A | * | 1/1997 | Hibi | 358/518 |
| 5,774,636 A | * | 6/1998 | Sousa | 358/1.9 |
| 5,812,169 A | * | 9/1998 | Tai et al. | 347/110 |
| 5,838,885 A | * | 11/1998 | Shu et al. | 358/1.9 |
| 5,872,896 A | * | 2/1999 | Li et al. | 358/1.9 |
| 5,910,795 A | * | 6/1999 | Whittaker | 345/669 |
| 5,917,994 A | * | 6/1999 | Perumal et al. | 358/1.9 |
| 5,956,468 A | * | 9/1999 | Ancin | 358/1.9 |
| 5,956,470 A | * | 9/1999 | Eschbach | 358/1.9 |
| 5,973,803 A | * | 10/1999 | Cheung et al. | 358/534 |
| 5,982,993 A | * | 11/1999 | Slade | 358/1.9 |
| 6,038,039 A | * | 3/2000 | Zeng | 358/447 |
| 6,141,462 A | * | 10/2000 | Yoshino et al. | 382/284 |
| 6,236,425 B1 | * | 5/2001 | Kobayashi et al. | 347/237 |
| 6,263,101 B1 | * | 7/2001 | Klein | 382/162 |
| 6,290,329 B1 | * | 9/2001 | Terasawa et al. | 347/43 |
| 6,333,998 B1 | * | 12/2001 | Matsumoto | 382/217 |
| 6,404,918 B1 | * | 6/2002 | Hel-or et al. | 382/167 |
| 6,449,060 B1 | * | 9/2002 | Kawai et al. | 358/1.9 |
| 6,515,764 B1 | * | 2/2003 | Knox et al. | 358/1.9 |
| 6,574,364 B1 | * | 6/2003 | Economidis et al. | 382/166 |
| 6,608,942 B1 | * | 8/2003 | Le | 382/279 |
| 6,618,503 B2 | * | 9/2003 | Hel-or et al. | 382/167 |
| 6,650,793 B1 | * | 11/2003 | Lund et al. | 382/299 |
| 6,654,141 B1 | * | 11/2003 | Matsukubo | 358/1.2 |
| 6,657,663 B2 | * | 12/2003 | Morris | 348/273 |

(Continued)

FOREIGN PATENT DOCUMENTS

JP    5-24253    2/1993

(Continued)

Primary Examiner—Madeleine Nguyen
(74) Attorney, Agent, or Firm—Westerman, Hattori, Daniels & Adrian, LLP

(57) ABSTRACT

When a multicolor image indicated by image data is generated, a signal for generation of a monochrome image according to the image data is amended according to the information about the monochrome image contained in the image data and according to the information about a monochrome image of another color contained in the image data. Then, monochrome images are generated according to the amended signals, and the multicolor image is generated by overlapping the generated monochrome images.

18 Claims, 22 Drawing Sheets

U.S. PATENT DOCUMENTS

| | | | |
|---|---|---|---|
| 6,690,485 B1 * | 2/2004 | Borrell et al. | ................ 358/1.9 |
| 2003/0026496 A1 * | 2/2003 | Nou | |
| 2003/0048958 A1 * | 3/2003 | Ishiguro | |

FOREIGN PATENT DOCUMENTS

| | | |
|---|---|---|
| JP | 5-37779 | 2/1993 |
| JP | 5-165972 | 7/1993 |
| JP | 5-191606 | 7/1993 |
| JP | 5-233820 | 9/1993 |
| JP | 5-318818 | 12/1993 |
| JP | 6-90355 | 3/1994 |
| JP | 6-131465 | 5/1994 |
| JP | 6-253146 | 9/1994 |
| JP | 9-83816 | 3/1997 |

* cited by examiner

APPARATUS AND METHOD FOR GENERATING MULTICOLOR IMAGE

BACKGROUND OF THE INVENTION

1. Field of the Invention

The present invention relates to a technology applicable to an apparatus and a method of generating a multicolor image from image data, and more specifically to a technology of improving the quality of an image to be generated.

2. Description of the Related Art

An image quality improvement technology referred to as a smoothing technology for automatically determining a jaggy image (jags formed as a group of printed dots) frequently generated in printing a character, a lineal drawing, etc. from printing bit map data developed on an image memory; converting the portion on which the jags are generated into the resolution higher than that of the original data; and representing and printing the jags as a visually smooth line, thereby apparently reducing the jags, is applied to a number of monochromatic printing devices such as a monochromatic laser beam printer which is a kind of image generation device used as an output device of a computation system.

FIG. 1 shows the configuration of the laser beam printer to which the above described image quality technology is applied.

The printing data input from an upper computation system, etc. is developed to image data by an image development unit 1001, and stored in image memory 1002.

The image data stored in the image memory 1002 is read to an image quality improvement/laser modulation signal generation circuit 1003. The image quality improvement/laser modulation signal generation circuit 1003 improves the image quality of the image data through the above described smoothing technology, and generates a signal for modulation of a laser beam generated by a laser 1011 in an optical unit 1010 of an image generation unit 1004. The internal configuration of the image quality improvement/laser modulation signal generation circuit 1003 is described later in detail.

A laser modulation signal generated by the image quality improvement/laser modulation signal generation circuit 1003 is input to the image generation unit 1004, and a printing process is performed in a printing medium such as paper, film, etc. according to the laser modulation signal.

The control circuit 1005 controls the image development unit 1001 and the image quality improvement/laser modulation signal generation circuit 1003 to operate these circuits in synchronization with a laser scanning timing signal indicating the scanning timing of a laser beam for one line of image data.

Described below is the internal configuration of the image generation unit 1004.

The optical unit 1010 includes the laser 1011, a polygon mirror 1012, a mirror motor 1013, and a beam detector 1014.

The laser 1011 outputs a laser beam modulated by the laser modulation signal generated by the image quality improvement/laser modulation signal generation circuit 1003. The laser beam is reflected by the polygon mirror 1012, and is lead to a mirror 1021. The polygon mirror 1012 is designed to rotate in a single direction by the mirror motor 1013 such that a laser beam reaching the mirror 1021 repeats linear scanning in a single direction. The laser beam reflected by the polygon mirror 1012 is input to the beam detector 1014 on each scanning cycle, and is detected thereby. The beam detector 1014 outputs a laser scanning timing signal depending on the input detection intervals of a laser beam, and transmits the signal to a control circuit 1005.

The laser beam reflected by the mirror 1021 is emitted to a light-sensitive drum 1022. The laser beam repeats scanning in a single direction vertical to the rotation direction of the light-sensitive drum 1022 at a constant speed, and forms an electrostatic latent image on the light-sensitive drum 1022. Then, a development device 1012 applies toner onto the light-sensitive drum 1022 on which the electrostatic latent image.

Then, the toner applied onto the light-sensitive drum 1022 is transferred to the printing medium which passes through a medium path between the light-sensitive drum 1022 and a transfer roller 1024, and is then fixed to the printing medium by heat and pressure, thereby performing a printing operation.

The improvement of an image performed by the laser beam printer shown in FIG. 1 is described below by referring to FIG. 2.

The image quality improvement/laser modulation signal generation circuit 1003 first discriminates the generation of jags from the arrangement of the dots represented by the image data shown by (A) in FIG. 2 and stored in the image memory 1002. Then, the output timing of a laser modulation signal from the line N to the line N+1 where the generation of jags is detected is adjusted to be the timing as shown by the lines N and N+1 shown by (B) in FIG. 2. A laser beam is modulated according to the laser modulation signal to allow the light-sensitive drum 1022 to form an electrostatic latent image, and to perform a printing operation at the resolution higher than that of the original image data, thereby obtaining a printout with reduced jags shown by (C) in FIG. 2.

FIG. 3 shows the detailed configuration of the image quality improvement/laser modulation signal generation circuit 1003. In FIG. 3, the image quality improvement/laser modulation signal generation circuit 1003 includes an image memory read circuit 1031, a line buffer 1032, an evaluation window extraction circuit 1033, and an amendment signal generation circuit 1034.

The image memory read circuit 1031 reads the printing bit map data developed on the image memory 1002, and transfers it to the line buffer 1032. The line buffer 1032 includes a shift register, and stores the printing bit map data transmitted from the image memory read circuit 1031.

The evaluation window extraction circuit 1033 extracts data in a rectangular area (referred to as a evaluation window) containing a pixel (referred to as a target dot) in the center which is regarded as a target in the data stored in the line buffer 1032, and outputs an extraction pattern arrangement signal indicating the dot arrangement in the evaluation window. The extraction pattern arrangement signal is input to the amendment signal generation circuit 1034.

The amendment signal generation circuit 1034 is used to generate an image of a target dot based on the dot arrangement in the evaluation window, and includes a lookup table containing laser modulation signal pattern data obtained according to an extraction pattern arrangement signal. FIG. 4 shows an example of the correspondence between the dot arrangement pattern in the rectangular area extracted when, in the dot arrangement pattern of the image data shown by (A) in FIG. 2, the dot at the line=N and the dot=M, and the adjacent dots are target dots, and when the size of the evaluation widow is 5×5 dots, and the arrangement pattern of the dots printed on the print medium corresponding to the target dots. When a signal indicating the extraction arrangement pattern shown on the left of each arrow shown by (A) through (I) in FIG. 4 is input, the amendment signal generation circuit 1034 outputs a laser modulation signal according to which the image generation unit 1004 generates an image of the dot pattern shown on the right of each arrow shown by (A) through (I) in FIG. 4. The output laser modulation signal is provided for the optical unit 1010 of the image generation unit 1004.

In the example shown in FIG. 4, the pattern of the target dot and the surrounding dots in the extraction pattern is different from the printing pattern of the target dot shown by (D), (E), (G), and (H) in FIG. 4. The printing dots are designed according to the following regulations.

(D) When the dots of image data (hereinafter referred to as image dots) are not contained in a target dot, and the image dots exist diagonally above to the right of, on the right of, and below the target dot, printing dots occupy one third on the right of the target dot.

(E) When the image dots are contained in the target dot, and the image dots exist above, the diagonally below to the left of the target data, printing dots occupy the center of, and one third on the left of the target dot, that is, occupy two thirds on the left of the target dot.

(G) When the image dots are contained in the target dot, and the image dots exist diagonally above to the right of, and below the target dot, printing dots occupy the center of, and one third on the right of the target dot, that is, occupy two thirds on the right of the target dot.

(H) When the image dots are not contained in the target dot, and the image dots exist above, to the left of, and diagonally below to the left of the target dot, printing dots occupy one third on the left of the target dot.

The rules used in the smoothing technology are not limited to the rules shown in FIG. 4, but the amendment signal generation circuit 1034 also stores a number of correction patterns other than those listed above. These rules are set from experience through trial and error, and not a few rules are different from the above described rules.

In the image quality improvement/laser modulation signal generation circuit 1003 shown in FIG. 3, the target slot in the data stored in the line buffer 1032 is sequentially moved in synchronization with the dot printing timing in the image generation unit 1004. The laser modulation signal is generated and output for the target dot at the actual timing of printing dots corresponding to the target dot. Thus, the laser modulation signal shown by (B) in FIG. 2 is obtained, thereby successfully improving the image quality as shown by (C) in FIG. 2.

A control clock signal generation circuit 1051 shown in FIG. 3 is contained in the control circuit 1005 shown in FIG. 1, and generates a control clock for operating each unit at the above described operation timing in synchronization with the laser scanning timing signal obtained by the optical unit 1010.

Description below is the color printer which is a multicolor image generation apparatus for generating a multicolor image from image data.

A color printer can be a laser beam system, an ink jet system, a heat transfer system, etc. In any of these systems, images printed in the three primary colors, that is, Y (yellow), M (magenta), and C (cyan), are overlapped on a printing medium. In addition to the three primary colors, R (red), G (green) and B (blue) obtained by overlapping any two colors of Y, M, and C, and K obtained by overlapping the three primary colors can represent seven colors (in this example, no gray scale is applied to each color for simple explanation). The colors, Y, M, and C are referred to as the primary colors, and the colors R, G, B, and K represented by overlapping these primary colors are referred to as secondary colors.

FIG. 5 shows an example of the configuration of the color laser beam printer.

In the color laser beam printer shown in FIG. 5, the printing data input from an upper computer system, etc. is analyzed by an image development unit 1101 into bit map data of three primary colors Y, M, and C, and is then developed on an image memory 1102. An image generation unit 1104 performs the image generating process for the three colors Y, M, and C sequentially, and transfers the result to a single printing medium. At this time, a laser modulation signal generation circuit 1103 generates a laser modulation signal using the data read from the respective planes of Y, M, and C of the above described color-analyzed bit map data. The image generation unit 1104 generates an image for each of the colors Y, M, and C. Unlike the laser modulation signal generation circuit 1003 shown in FIG. 1, the laser modulation signal generation circuit 1103 shown in FIG. 5 does not improve the quality of an image using the smoothing technology.

An optical unit 1110 in the image generation unit 1104 includes a laser 1111, a polygon mirror 1112, a mirror motor 1113, and a beam detector 1114. These components are similar to the components of the optical unit 1010 shown in FIG. 1.

The laser beam reflected by a mirror 1121 in the image generation unit 1104 is emitted onto a light-sensitive drum 1122. The laser beam repeats the scanning operation on the light-sensitive drum 1122, and allows the light-sensitive drum 1122 to form the electrostatic latent image of one of the color planes of Y, M, and C. When a development unit 1123 applies the toner of the corresponding color to the electrostatic latent image generated by the light-sensitive drum 1122. Then, the toner applied to the light-sensitive drum 1122 is transferred and fixed onto a single printing medium passing through the path and a transfer roller 1124. The color printing process can be performed by repeatedly performing the above described operation on each of the planes of Y, M, and C.

The color laser beam printer shown on FIG. 5 performs the process of transferring and fixing the toner of the colors of Y, M, and C applied to the light-sensitive drum 1122 on a single printing medium. Another color laser beam printer temporarily transfers the toner of each color applied to the light-sensitive drum 1122 to an intermediate transfer medium, and then simultaneously transfers and fix the toner of respective colors from the intermediate transfer medium to a single printing medium, thereby avoiding the color shift in color printing.

In the color laser beam printer shown in FIG. 5, K (black) is represented by overlapping the three colors Y, M, and C. However, it is difficult to obtain the toner of the ideal three primary colors Y, M, and C. Therefore, the three overlapped colors Y, M, and C do not represent black in many cases. Therefore, a number of color laser beam printer performs the color printing process by overlapping the toner of K (black) in addition to the toner of the three colors Y, M, and C on the printing medium (or an intermediate transfer medium).

FIG. 6 shows an example of the configuration of the color laser beam printer using the toner of the four colors Y, M, C, and K. In FIG. 6, the components also shown in FIG. 5 are assigned the same unit numbers.

With the configuration shown in FIG. 6, the printing data input from an upper computer system, etc. is developed by the image development unit 1101 into the bit map data of black and the bit map data analyzed into the above described three primary colors from an area other than black, and is then developed on an image memory 1102'.

An image generation unit 1104' includes the development unit 1123 for developing each of the four colors Y, M, C, and K. The image generating process is performed on each of the color planes, and the result is transferred to a single printing medium (or an intermediate transfer medium). In the process of generating images of the colors Y, M, C, and K, the data read from each of the planes of colors Y, M, C, and K of the above described color-analyzed bit map data is used, thereby successfully realizing the multicolor printing.

The problems with the cases in which the quality of an image is improved by the smoothing technology similar to the technology of a monochrome printer are described below by referring to FIGS. 7 and 8.

FIGS. 7 and 8 show the process of developing the color printing data indicating the similar bit arrangement as shown in FIG. 2 as input from an upper computer system, etc. into the bit map data analyzed into the three primary colors Y, M, and C by the image development unit 1101 shown in FIG. 5, and performing the smoothing process on the data of each plane analyzed into the three primary colors according to the similar rules shown in FIG. 4. FIG. 7 shows an example of the case in which the printing data input from an upper computer system, etc. is represented by a pattern of one color of B (blue). FIG. 8 shows an example of the case in which the printing data input from an upper computer system, etc. is represented by a pattern of two colors of B (blue) and R (red).

In the case shown in FIG. 7, B (blue) in the color printing data shown by (A) is color-analyzed into M (magenta) and C (cyan), and is developed on the image memory 1102 as the bit map data for each plane represented by (B). When the smoothing process is individual performed on the data of each plane according to the rule similar to the rule of the monochrome printing shown in FIG. 2, the smoothing result with the dot arrangement shown by (C) in FIG. 7 can be obtained for each plane, and the final printing result as shown by (D) in FIG. 7 can be obtained. Thus, When the printing data input from an upper computer system, etc. is represented by a monochrome pattern, the smoothing technology is applied to each plane obtained by analyzing data into the three primary colors with an excellent printing result with reduced jags according to the same rules as in the monochrome printing process.

On the other hand, the color printing data shown by (A) in FIG. 8, B (blue) is analyzed into M (magenta) and C (cyan), and R (red) is analyzed into Y (yellow) and M (magenta). They are then developed on the image memory 1102 as the bit map data for each plane as shown by (B). When the smoothing technology is applied to the data for each plane according to the rules similar to the rules of the monochrome printing process shown in FIG. 2, the smoothing result with the dot arrangement as shown by (C) in FIG. 8 can be obtained. According to the result, the printing process can be performed with the three primary colors, that is, Y (yellow), M (magenta), and C (cyan), not appearing in the original color printing data as shown by (D) output actually.

Thus, when different colors represented by the same primary color are adjacent to each other, and when a printed image indicates the color not appearing in the original image data but obtained as a result of performing the smoothing process based on the same rules as the monochrome printing process on each plane of Y, M, and C, the edge of the line at the point at which the color not appearing in the original image data actually appears is recognized as a vague image. When the printed image is compared with the printed image obtained without performing the smoothing process, it is often determined that the printed image without the smoothing technology is better. Therefore, it is not determined that the quality of the image can be improved in the above described method.

SUMMARY OF THE INVENTION

The present invention aims at improving the quality of a multicolor image generated by image data.

The present invention is based on the apparatus or the method for generating multicolor images indicated by the image data obtained by overlapping monochrome images of different colors generated according to the image data.

According to the first embodiment of the present invention, a signal for generation of a monochrome image is amended according to the information about the monochrome image contained in image data, and the information about another monochrome image, that is, an image of another monochrome, contained in the image data. According to the amended signal, the monochrome image is generated. The generated monochrome image is overlapped with the another monochrome image, thereby generating a multicolor image.

A signal for generation of a monochrome image is amended, for example, based on the correlation in color and arrangement among pixels forming a multicolor image represented by image data.

Otherwise, a signal for generation of a monochrome image is amended, for example, by changing the arrangement of the pixels forming a monochrome image to be generated.

With the configuration according to the above described first embodiment of the present invention, a monochrome image can be amended to improve the quality of a multicolor image not only according to the information about the monochrome image, but also according to the information about another monochrome image forming part of the multicolor image. Therefore, a monochrome image can be amended such that a multicolor image to be generated cannot contain a color not appearing in the original image data.

With the above described configuration, the first embodiment of the present invention can further include an extraction unit for extracting partial image data indicating a part of an image represented by image data from the image data to amend a signal for generation of a monochrome image according to the information of the partial image data. In this example, the extraction unit is designed to extract partial image data representing a partial image containing pixels forming a monochrome image to be formed and containing pixels in the vicinity of the pixels. With the configuration, the number of pieces of data as the condition of amending a signal can be reduced, thereby reducing the size of the circuit of the apparatus according to the first embodiment of the present invention.

With the above described configuration, the first embodiment of the present invention can further include a selection unit for selecting a signal for generation of a monochrome image for each color form the amended signal. With the configuration, an amended signal for generation of a monochrome image can be applied to each color for the multicolor image generation apparatus designed to sequentially generate monochrome images for respective colors.

With the above described configuration, the first embodiment of the present invention can further include a generation unit for generating a signal for generation of a black image, which is contained in monochrome images forming a multicolor image, from an amended signal for generation of another monochrome image. With the configuration, the first embodiment of the present invention can be realized for a multicolor image generation apparatus capable of independently generating a black image which cannot be easily obtained by overlapping colors.

The second embodiment of the present invention can have the following configuration.

First, a signal for generation of a monochrome image is amended according to the information about the monochrome image contained in image data.

The amended signal for generation of a monochrome image is corrected based on the amendment result of the signal for generation of a monochrome image of another color.

The amended signal for generation of a monochrome image is corrected, for example, based on the correlation in color and arrangement among the pixels forming the multicolor image to be generated using the amended signal.

In addition, the amended signal for generation of a monochrome image can be corrected, for example, by returning an amended signal back to an unamended signal.

With the above described configuration according to the second embodiment of the present invention, an amendment made to a monochrome image to improve the quality of a multicolor image can be corrected based on the amendment result of another monochrome image forming part of the multicolor image. Therefore, it is possible to correct the result of amending a monochrome image such that a color not appearing in the original image data cannot appear in the multicolor image to be generated.

With the above described configuration, the second embodiment of the present invention can include an amendment unit for amending each of the signals for generation of a monochrome image forming part of a multicolor image. The amendment unit can be designed to amend each signal based on the same rules. The amendment unit is designed, for example, to amend a signal for generation of a monochrome image so that the arrangement of the pixels forming a monochrome image to be generated can be changed. With the configuration, the amendment unit provided for each signal for generation of a monochrome image of each color can be shared, thereby contributing to a lower cost.

With the above described configuration, the second embodiment of the present invention can further include an extraction unit for extracting partial image data indicating a part of an image represented by the image data from the image data so that a signal for generation of a monochrome image can be amended according to the information contained in the partial image data. The extraction unit is designed, for example, to extract partial image data indicating the partial image containing a pixel forming a monochrome image to be generated and containing pixels in the vicinity of the pixel. With the configuration, the number pieces of data of the condition of amending a signal, thereby reducing the size of the apparatus according to the second embodiment of the present invention.

In addition, with the above described configuration, the second embodiment of the present invention can include a selection unit for selecting a signal for generation of a monochrome image for each color from the amended signal for generation of a monochrome image. With the configuration, an amended signal for generation of a monochrome image can be applied to each color for the multicolor image generation apparatus designed to sequentially generate monochrome images for respective colors.

With the above described configuration, the second embodiment of the present invention can further include a generation unit for generating a signal for generation of a black image, which is contained in monochrome images forming a multicolor image, from an amended signal for generation of another monochrome image. With the configuration, the second embodiment of the present invention can be realized for a multicolor image generation apparatus capable of independently generating a black image which cannot be easily obtained by overlapping colors.

Thus, in any embodiment of the present invention, the quality of a multicolor image generated from image data can be improved more effectively than the conventional method.

BRIEF DESCRIPTION OF THE DRAWINGS

The present invention will be more apparent from the following detailed description when the accompanying drawings are referenced.

DESCRIPTION OF THE PREFERRED EMBODIMENTS

The embodiments of the present invention are described below by referring to the attached drawings. Practically described below is to embody the present invention by a color laser beam printer for printing a multicolor image with the quality of an image improved by the smoothing technology.

Figure 9:
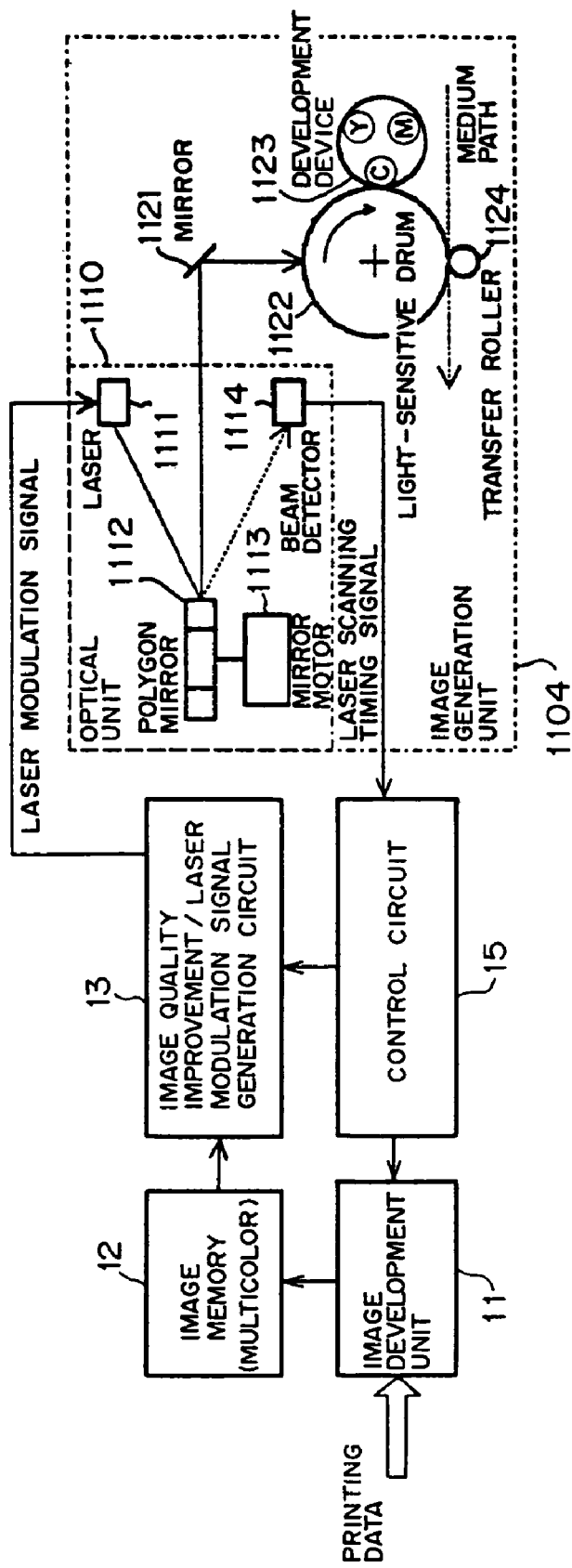
FIG. 9 shows the entire configuration of the color laser beam printer embodying the present invention.

FIG. 9 shows the entire configuration of the color laser beam printer embodying the present invention. The printer shown in FIG. 9 operates in the system of printing a multicolor image by overlapping three colors of Y, M, and C. In FIG. 9, the components also appearing in the conventional color laser beam printer as shown in FIG. 5 are assigned the same unit numbers.

In FIG. 9, the printing data input from an upper computer system, etc. is developed by an image development unit 11, and stored as printing image data in image memory 12. Unlike the image development unit 1101 shown in FIG. 5, the image development unit 11 shown in FIG. 9 does not color-analyze the three primary colors Y, M, and C into bit map data, but develops on the image memory 12 multicolor information, that is, the bit map data with the color information of R (red), G (green), and B (blue) for each pixel maintained.

The image data stored in the image memory 12 is read to an image quality improvement/laser modulation signal generation circuit 13. The image quality improvement/laser modulation signal generation circuit 13 is a circuit for improving the quality of an image according to the present invention, improves the quality of an image using the technology described later on the image data, and generates based on the quality-improved image data a laser modulation signal for modulation of a laser beam generated by the laser 1111 of the optical unit 1110 in the image generation unit 1104.

Figure 5:
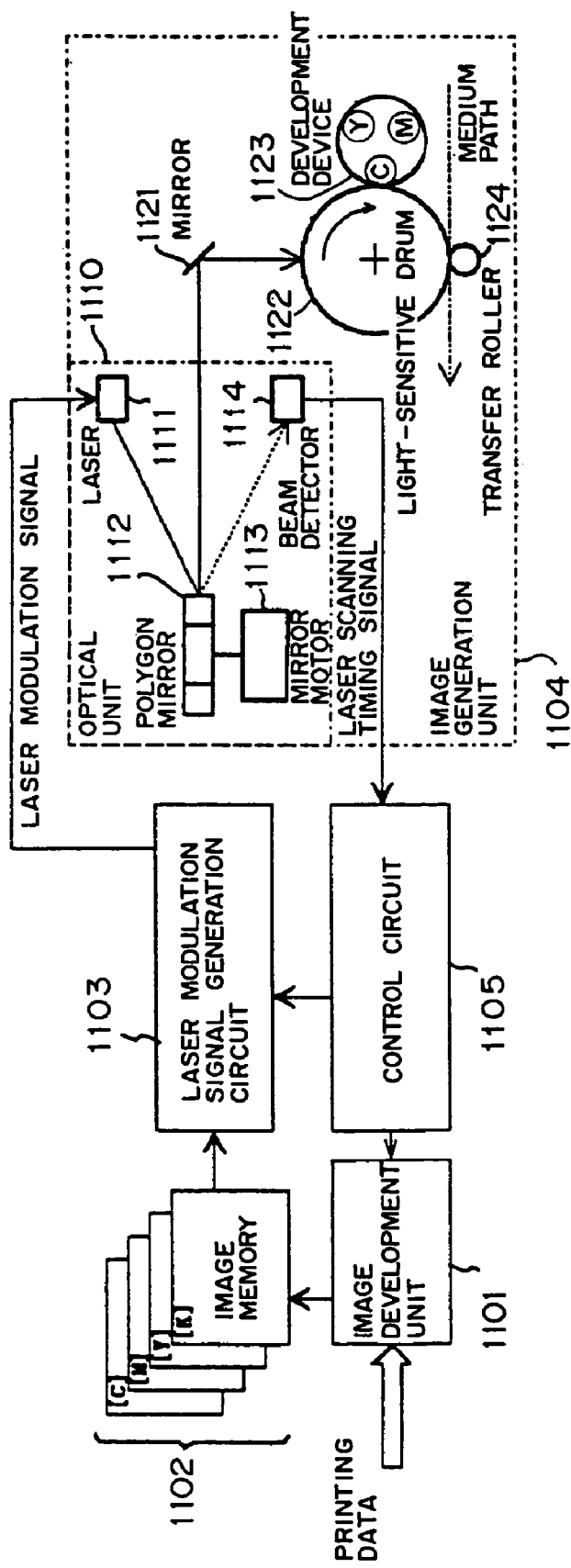
FIG. 5 shows an example of the configuration of the conventional color laser beam printer.

The image generation unit 1104 has the same configuration as the conventional color laser beam printer shown in FIG. 5.

A control circuit 15 controls the image development unit 11 and the image quality improvement/laser modulation signal generation circuit 13 to operate these circuits in synchronization with the laser scanning timing signal indicating the scanning timing of a laser beam output from the optical unit 1110 in the image generation unit 1104 on one line of image data.

Described below is the internal configuration of the image quality improvement/laser modulation signal generation circuit 13.

Figure 10:
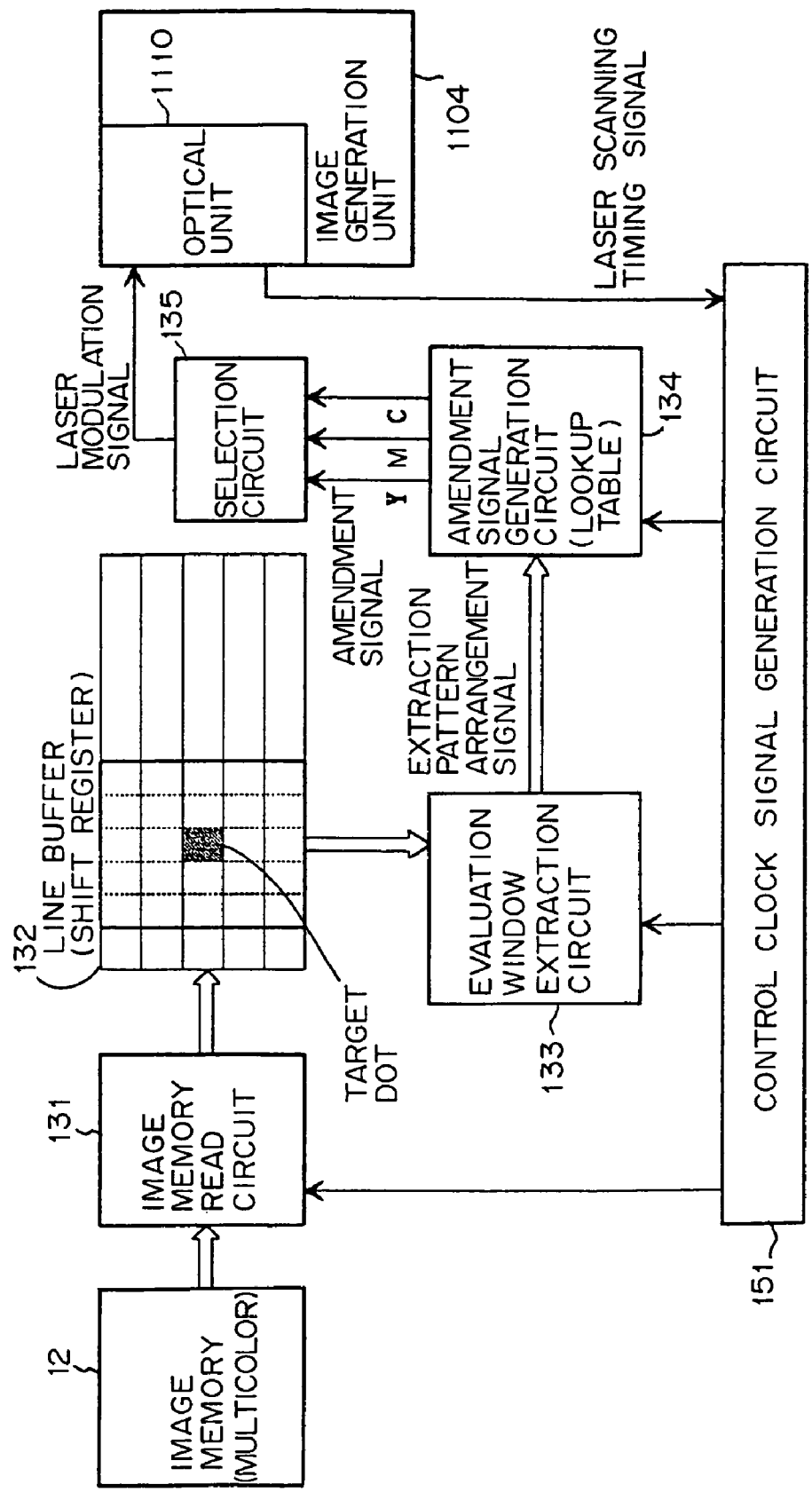
FIG. 10 is a block diagram of the first example of the detailed circuit configuration centering on the image quality improvement/laser modulation signal generation circuit in the color laser beam printer shown in FIG. 9.

FIG. 10 is a block diagram of the first example of the detailed circuit configuration centering on the image quality improvement/laser modulation signal generation circuit 13 in the color laser beam printer shown in FIG. 9. In FIG. 10, the components also appearing in FIG. 9 are assigned the same unit numbers.

In FIG. 10, the image quality improvement/laser modulation signal generation circuit 13 comprises an image memory read circuit 131, a line buffer 132, an evaluation window extraction circuit 133, an amendment signal generation circuit 134, and a selection circuit 135.

In a control clock signal generation circuit 151 forming part of the control circuit 15, a plurality of control cock signals are generated according to a laser scanning timing signal from the optical unit 1110 in the image generation unit 1104 and a control signal from another block (not shown in the attached drawings) in the control circuit 15. The image quality improvement/laser modulation signal generation circuit 13 is controlled to generate a laser modulation signal in synchronization with the process of exposing a laser beam in the optical unit 1110 according to these control clock signals.

The bit map data of a printing image is preliminarily developed and stored in the image memory 12. An address corresponding to the printing position in a printing area is assigned to each pixel data in the bit map data of the printing image. Each pixel data has multicolor data represented by three bits of R (red), G (green), and B (blue) as described above.

Figure 11:
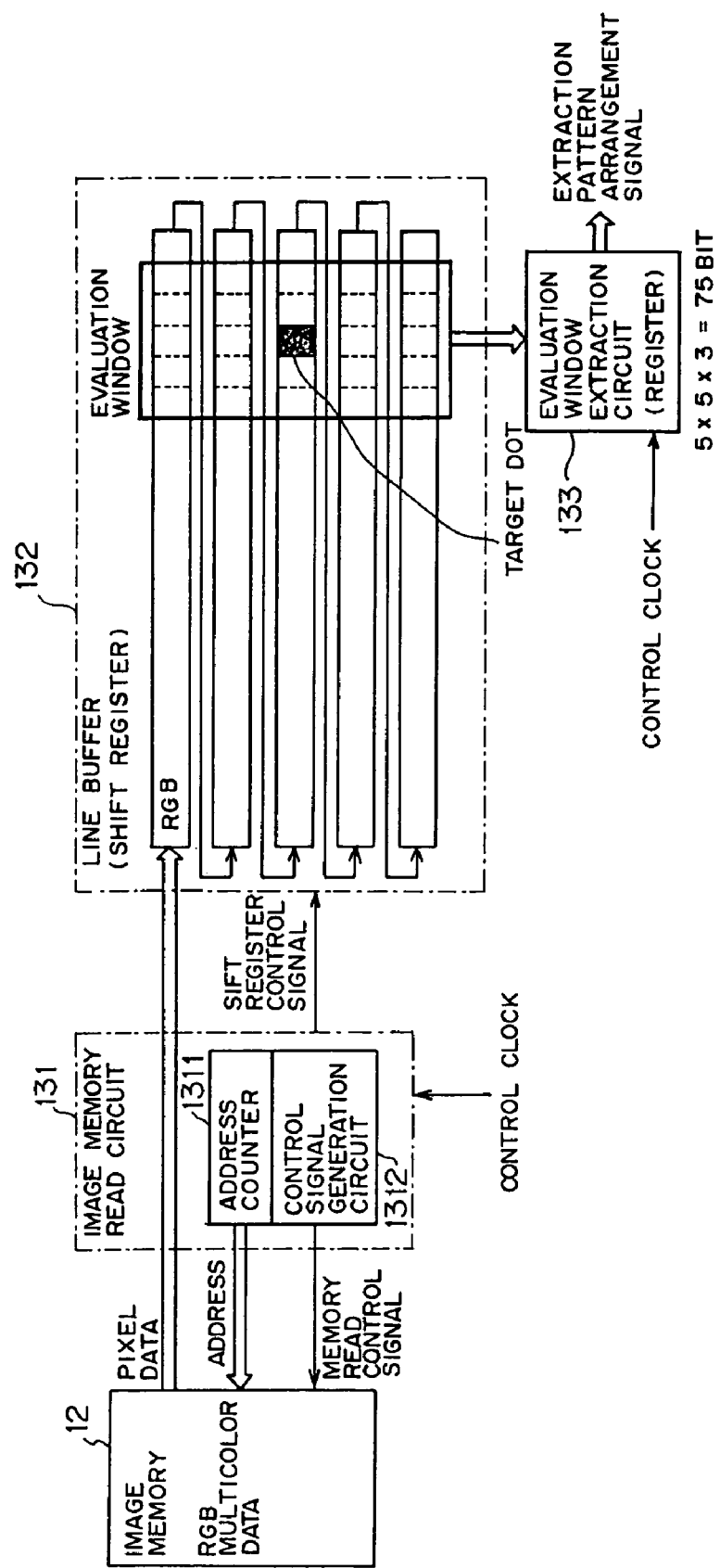
FIG. 11 shows the detailed configuration of the image memory read circuit and the line buffer shown in FIG. 9.

The image memory read circuit 131 and the line buffer 132 are described by referring to FIG. 11 showing the detailed configuration.

The image memory read circuit 131 comprises an address counter 1311 for generating the address of the pixel data read from the image memory 12; and a control signal generation circuit 1312 for outputting a control signal for control of reading data from the image memory 12, and writing data to the line buffer 132 comprising a shift register. These circuits are operated according to the control clock input from the control clock signal generation circuit 151 (FIG. 10), and one line of image data is read from the image memory 12 in synchronization with the write of one primary scanning line of an image to the light-sensitive drum 1122 (FIG. 9) using a laser beam, and is then stored in the line buffer 132. Therefore, in the line buffer 132, data is updated in synchronization with the write of primary scanning line of an image in the image generation unit 1104.

Figure 1:
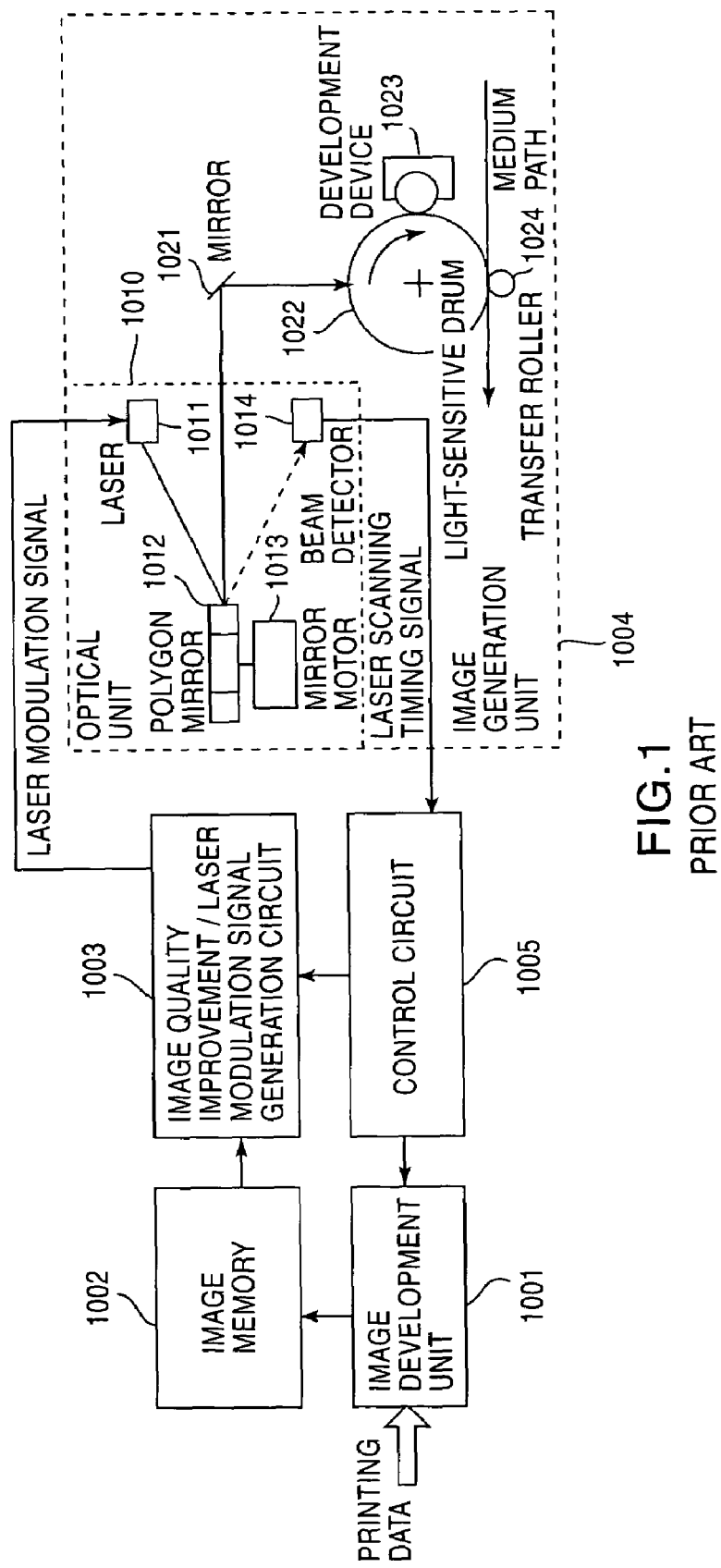
FIG. 1 shows the configuration of the conventional laser beam printer to which the smoothing technology applied.
Figure 2:
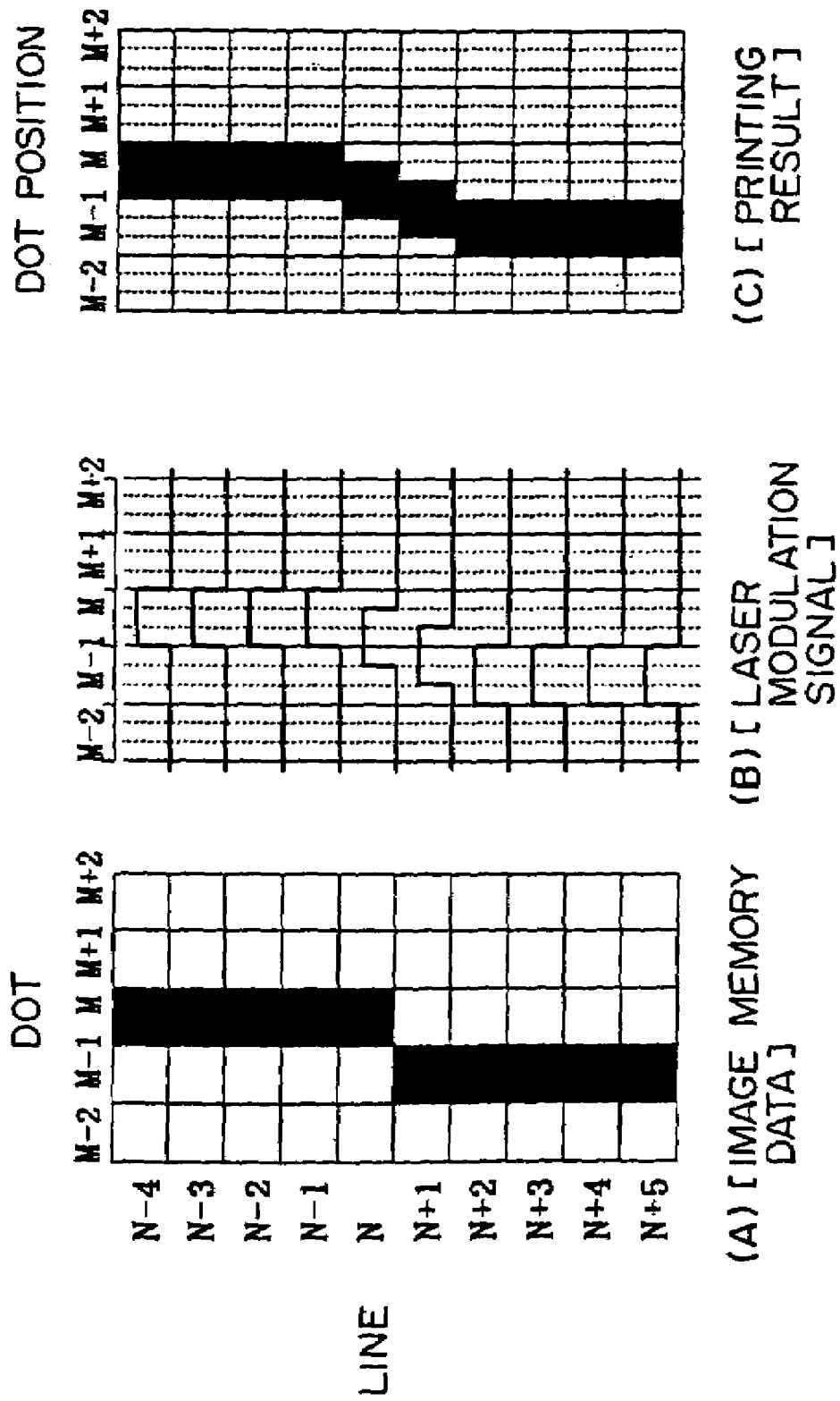
FIG. 2 shows the improvement of the quality of an image realized by the laser beam printer shown in FIG. 1.

Back in FIG. 2, the evaluation window extraction circuit 133 moves the position of a target dot in synchronization with the process of writing a dot in the image generation unit 1104, and extracts the data of the target dot and the data of the pixels in a predetermined area (evaluation window) around the target dot from the line buffer 132. Then, the evaluation window extraction circuit 133 outputs including the color information about each dot an extraction pattern arrangement signal indicating the arrangement of the extracted dot in the area. According to the present embodiment, the size of an evaluation window is set as 5×5 dots, and each dot is assigned 3-bit multicolor data for R (red), G (green), and B (blue). Therefore, the extraction pattern arrangement signal is the data of 5×5×3= 75 bits for each target dot.

The extraction pattern arrangement signal output from the evaluation window extraction circuit 133 is input to the amendment signal generation circuit 134.

Figure 12:
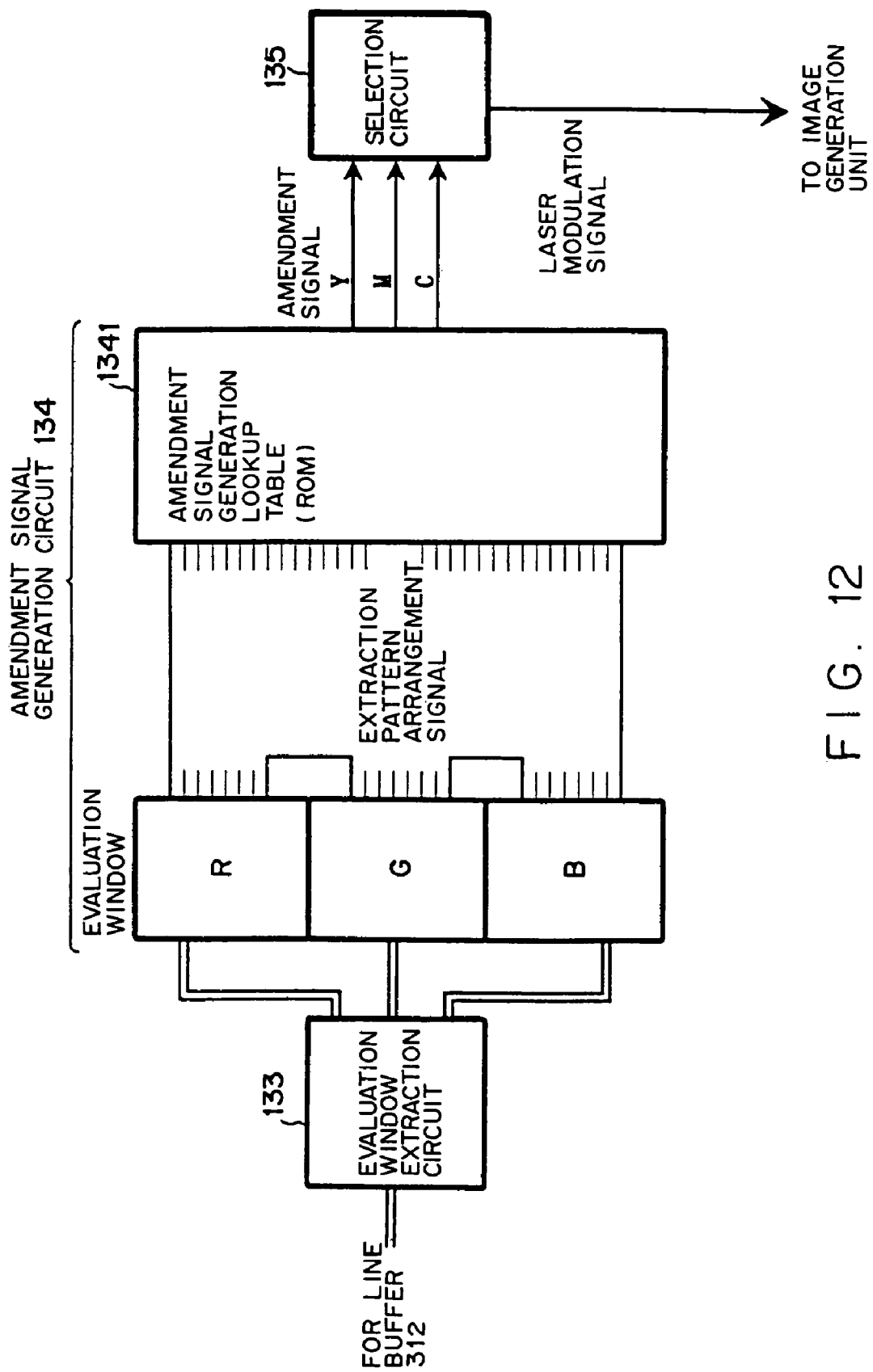
FIG. 12 shows the detailed configuration of the amendment signal generation circuit.

FIG. 12 shows the detailed configuration of the amendment signal generation circuit 134. As shown in FIG. 12, the amendment signal generation circuit 134 comprises an amendment signal generation lookup table 1341 which is ROM storing an amendment signal pattern applied to each of the primary printing colors Y, M, and C. When an extraction pattern arrangement signal containing the color information about each dot is provided for the amendment signal generation lookup table 1341 as an address signal, an amendment signal for each of the primary printing colors Y, M, and C based on the predetermined rule described later and stored at the address is output for each target dot. Thus, the amendment signal generation circuit 134 generates an amendment signal to be applied to each of the primary printing colors Y, M, and C with not only the arrangement of the pattern of extracted dots, but also the color information about each dot taken into account. In addition, an amendment signal applied to each of the primary printing colors Y, M, and C is generated according to the information about the colors other than the primary printing colors. These are the important points of the embodiment according to the present invention.

Since the extraction pattern arrangement signal contains the multicolor information about each dot, the amendment signal generation circuit 134 can simultaneously output an amendment signal applied to the plane of each of the primary printing colors Y, M, and C for three colors.

The selection circuit 135 is controlled to select an amendment signal for use in generating an image of primary color planes by the image generation unit 1104 from the amendment signal of each color applied to the plane of each of the primary colors Y, M, and C by another block (not shown in the attached drawings) in the control circuit 15 shown in FIG. 9. The selected amendment signal is output as a laser modulation signal to the optical unit 110.

Figure 13:
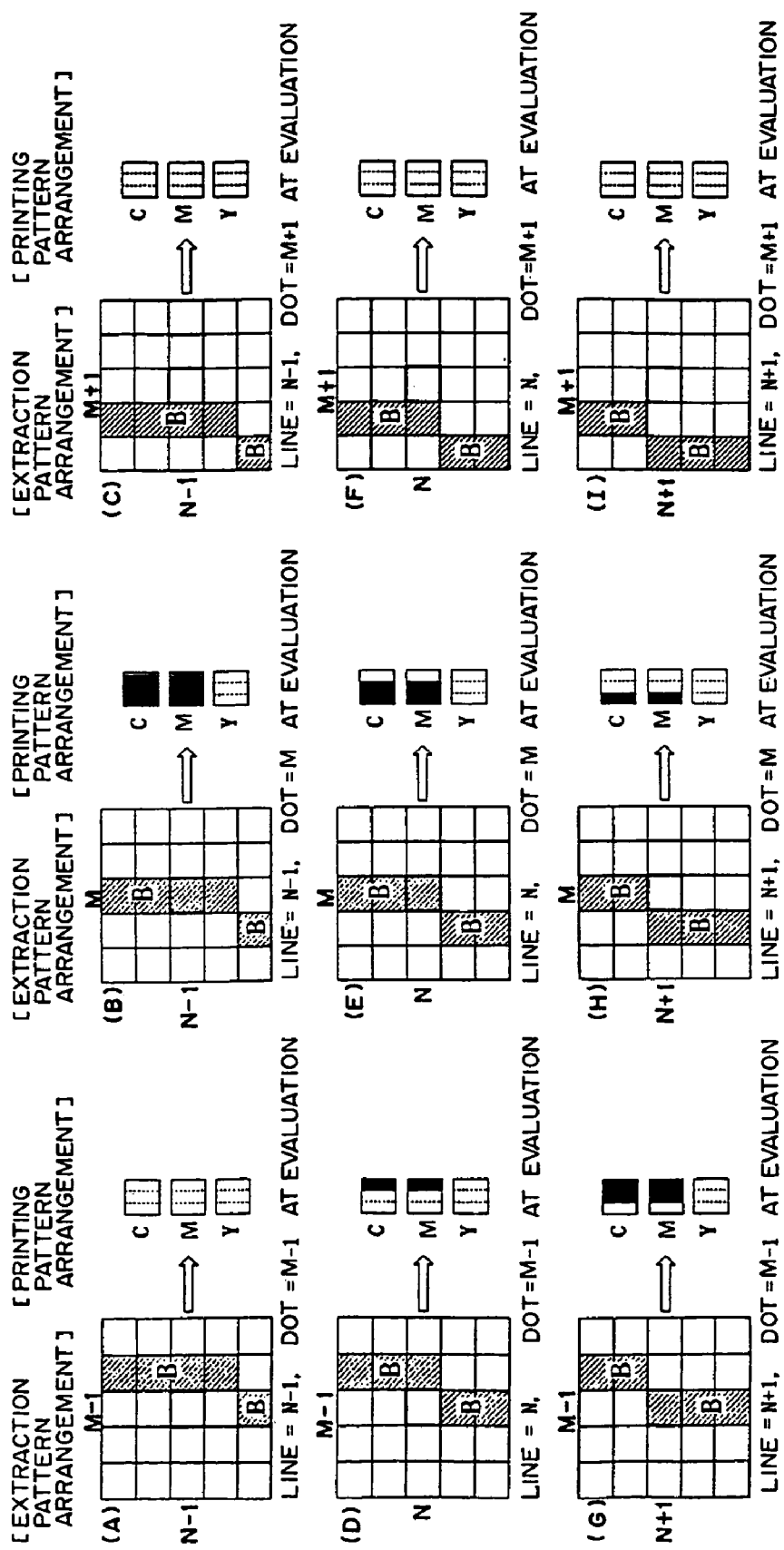
FIG. 13 shows an example (1) of the correspondence between the contents of the extraction pattern arrangement signal and the arrangement pattern of the printed dots of each color with the configuration shown in FIG. 9.
Figure 14:
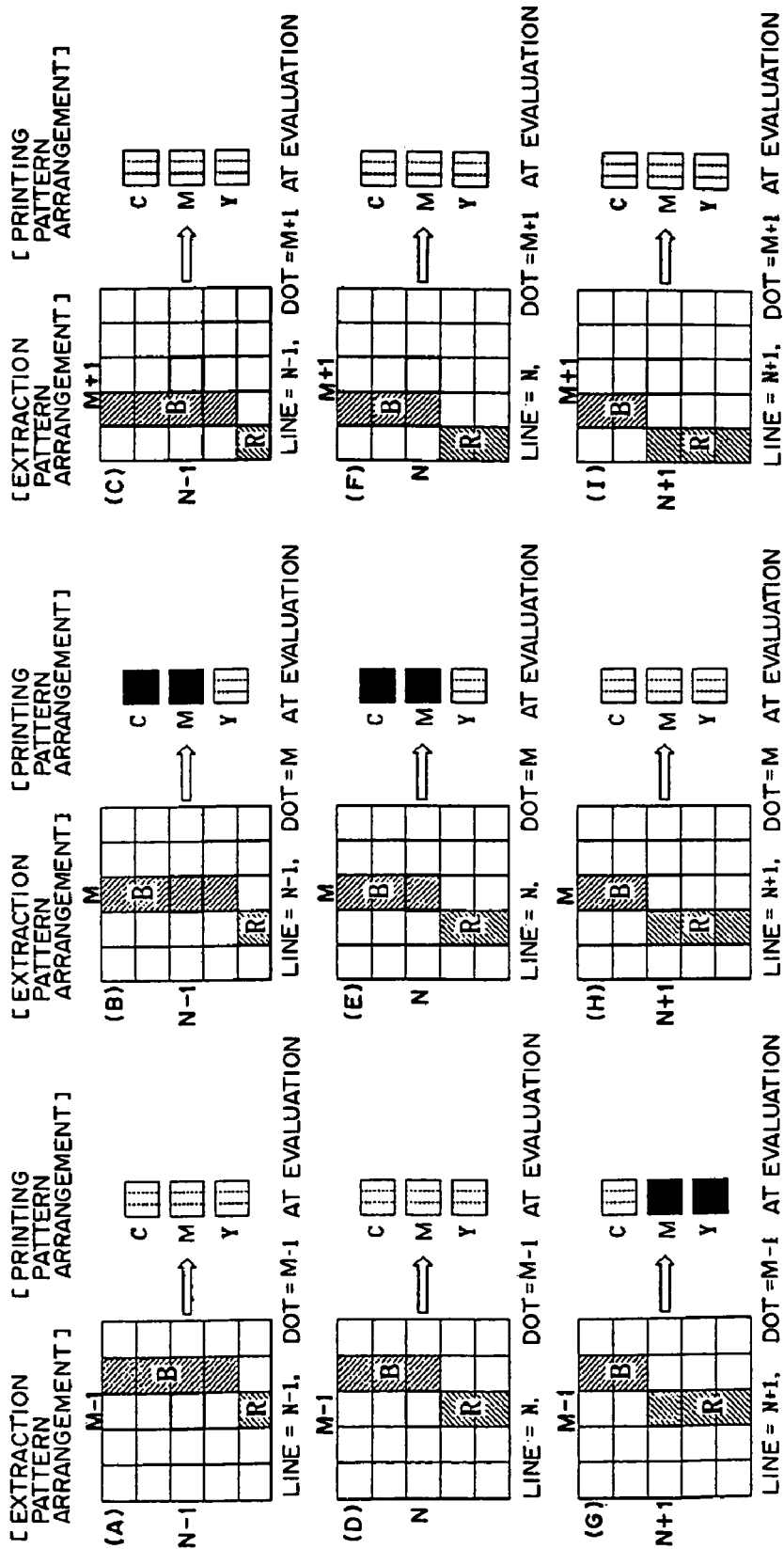
FIG. 14 shows an example (2) of the correspondence between the contents of the extraction pattern arrangement signal and the arrangement pattern of the printed dots of each color with the configuration shown in FIG. 9.

FIGS. 13 and 14 show an example of the correspondence between the extraction pattern arrangement signal input to the amendment signal generation circuit 134 and the arrangement pattern of the corresponding dot for the plane of each of the primary colors Y, M, and C of a target dot to be printed based on the pattern. In this example, the evaluation window is defined as a rectangular area of 5×5 dots including a target dot in the center.

When a signal indicating each of the extraction patterns (A) through (I) of the color and the arrangement of dots shown to the left of each arrow is input, the amendment signal generation circuit 134 outputs a laser modulation signal according to the rules defined on the lookup table such that an image of dots (A) through (I) for the plane of each of the primary colors Y, M, and C shown to the right of each of the arrows can be generated by the image generation unit 1104. The output laser modulation signal is provided for the optical unit 1110 in the image generation unit 1104 through the selection circuit 135. FIG. 13 shows an example of the correspondence between the obtained extraction pattern arrangement signal and the printing pattern of dots for the plane of each of the primary colors Y, M, and C to be printed as the corresponding dot of the target dot for the evaluation window when the dot at the position of line=N, and dot=M is defined as a target dot and when image data similar to the data shown in FIG. 7 (A) containing only one color B (blue) is input. FIG. 14 shows an example of the correspondence between the obtained extraction pattern arrangement signal and the printing pattern of dots for the plane of each of the primary colors Y, M, and C to be printed as the corresponding dot of the target dot for the evaluation window when the dot at the position of line=N, and dot=M is defined as a target dot and when image data similar to the data shown in FIG. 8 (A) containing two colors B (blue) and R (red) is input.

In the example shown in FIG. 13, the pattern of the target dot and the surrounding dots in the extraction pattern is different from the printing pattern of the target dot in (D), (E), (G), and (H), and an image of a dot corresponding to the target dot is generated according to the following rules.

(D) When no dots of image data (an image dot) are contained in the target dot, and image dots of B (blue) are contained diagonally above to the right of, to the right of, and below the target dot, printing dots occupy one third on the right of the target dot in the planes of C and M.

(E) When an image dot of B is contained in the target dot, and the image dots of B are contained above and diagonally below to the left of the target dot, printing dots occupy the center of, and one third to the left of the target dot, that is, occupy two thirds on the left of the target dot in the planes of C and M.

(G) When an image dot of B is contained in the target dot, and the image dots of B are contained diagonally above to the right of, and below the target dot, printing dots occupy the center of, and one third to the right of the target dot, that is, occupy two thirds on the right of the target dot in the planes of C and M.

(H) When no image dots are contained in the target dot, and image dots of B (blue) are contained above, to the left of, and diagonally below to the left of the target dot, printing dots occupy one third on the left of the target dot in the planes of C and M.

In the example shown in FIG. 14, as compared with the example shown in FIG. 13, the correspondence between the dot pattern of the target dot and the surrounding dots in the extraction pattern and the printing pattern of the target dot should be noticed in (D), (E), (G), and (H), and image dots are generated corresponding to the target dot according to the following rules.

(D) If no image dots are contained in the target dot, and image dots of B (blue) are contained diagonally above to the right of, and to the right of the target dot, and image dots of R (red) are contained below the target dot, then the pattern of the target dot in the extraction pattern is set as printing dots (that is, no printing dots are contained in the target dot in the plane of each color).

(E) If an image dot of B is contained in the target dot, an image dot of B is contained above the target dot, and an image dot of R is contained diagonally below to the left of the target dot, then the pattern of the target dot in the extraction pattern is set as printing dots (that is, printing dots are contained in the target dot in the planes of C and M to set the printing result of the target dot as B).

(G) If an image dot of B is contained in the target dot, an image dot of B is contained diagonally above to the right of the target dot, and an image dot of R is contained below the target dot, then the pattern of the target dot in the extraction pattern is set as printing dots (that is, printing dots are contained in the target dot in the planes of M and Y to set the printing result of the target dot as R).

(H) If no image dots are contained in the target dot, and an image dot of B is contained above the target dot, and image dots of R are contained to the left of, and diagonally below to the left of the target dot, then the pattern of the target dot in the extraction pattern is set as printing dots (that is, no printing dots are contained in the target dot in the plane of each color).

Figure 7:
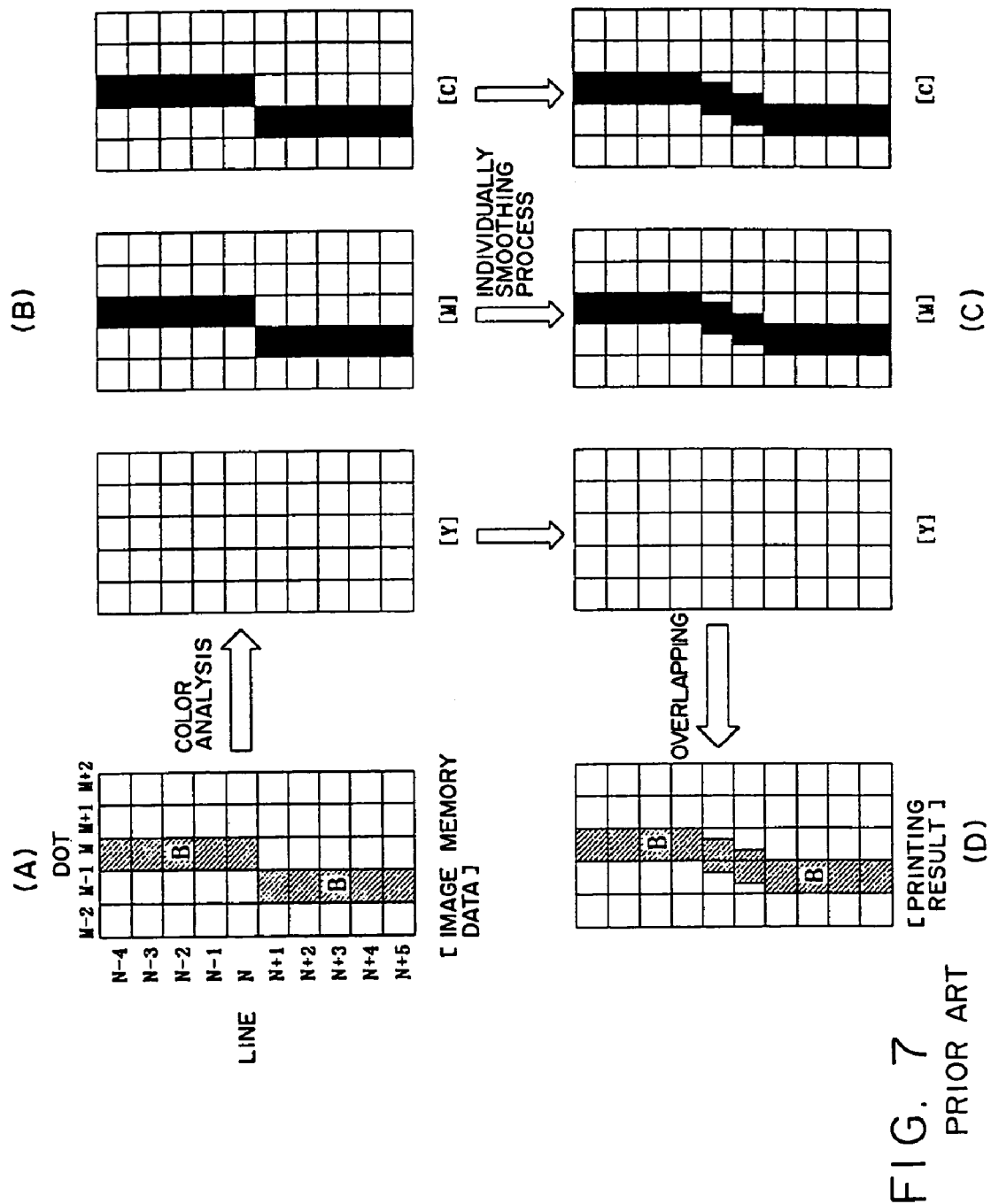
FIG. 7 shows the problem with the case in which the smoothing technology is performed using a color printer.
Figure 8:
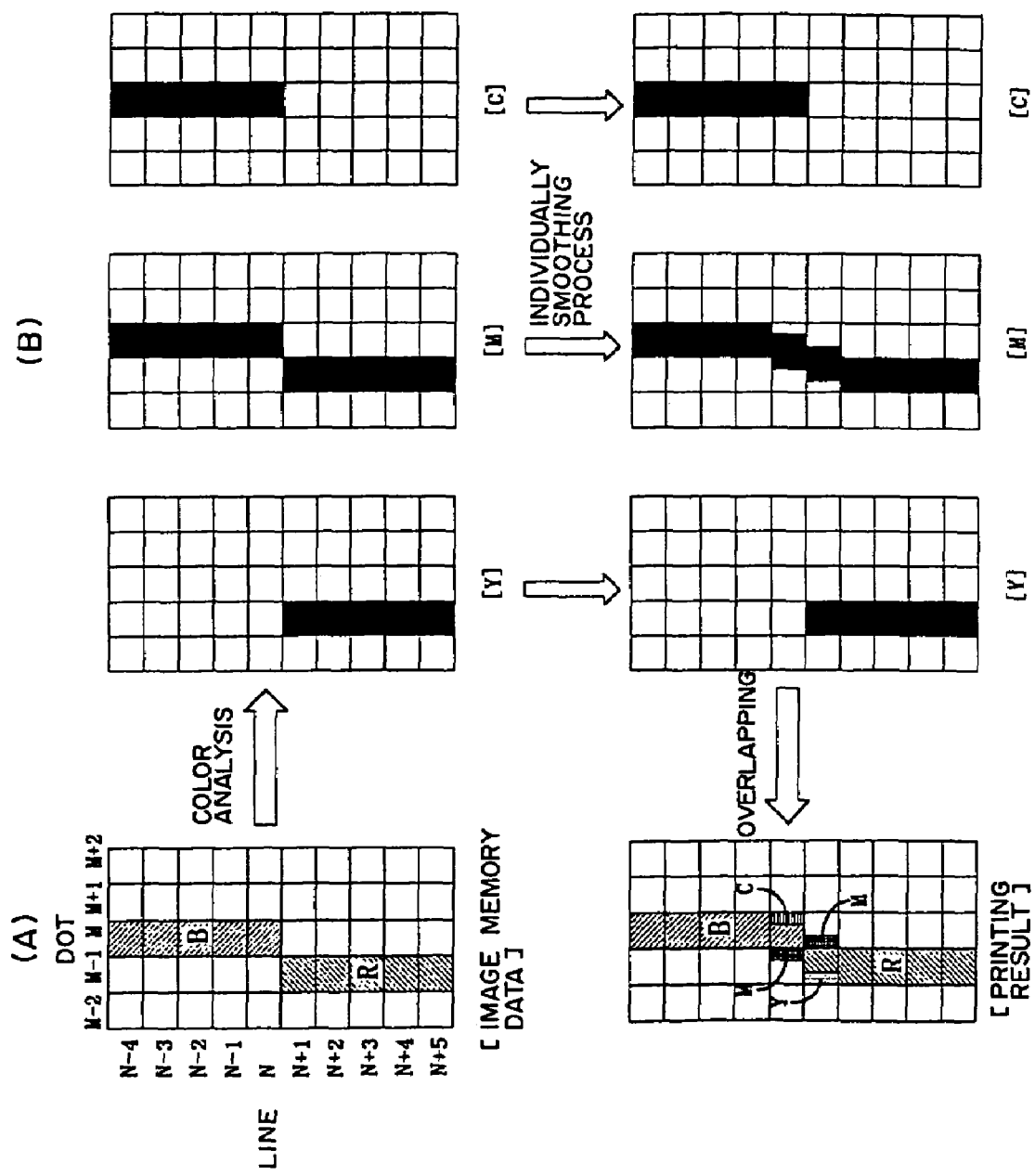
FIG. 8 shows the problem with the case in which the smoothing technology is performed using a color printer by comparison with FIG. 7.

In FIG. 13, when image data containing only a single color B (blue) is input as shown in FIG. 7 (A), the printing process is performed on each color for the dot arrangement using the smoothing technology for each color as shown in FIG. 7 (C). Thus, the printing result as shown in FIG. 7 (D) can be obtained. In FIG. 14, that is, when image data containing two colors B (blue) and R (red) as shown in FIG. 8 (A) is input, the printing process is not performed for the dot arrangement as shown in FIG. 8 (C), but is performed for the dot arrangement for each color without the smoothing technology shown in FIG. 8 (B). Thus, the printing result as shown in FIG. 8 (A) can be obtained without the smoothing effect.

Thus, with the first configuration shown in FIG. 10 as the image quality improvement/laser modulation signal generation circuit 13 shown in FIG. 9, the quality of an image can be improved by performing the smoothing process when printing data has a monochrome pattern, and by omitting the smoothing process when printing data has a pattern in which different colors represented by the same primary color are adjacent to each other. As a result, an image can be printed with the quality of the image successfully improved by suppressing the color as shown in FIG. 8 (D) not contained in the original image data.

Since the extraction pattern arrangement signal uses 75 bits, and a lookup table indicating an amendment signal pattern applied to each of the corresponding primary colors Y, M, and C is used according to the present embodiment, the storage capacity of the ROM storing the lookup table is large. Therefore, for example, when the evaluation window is smaller than 5×5 dots, or when all dots extracted from image data and arranged in the window are monochrome, the storage capacity of the ROM can be reduced if the amendment signal pattern does not depend on the color, but the same amendment signal pattern is used.

In the example shown in FIGS. 13 and 14, the resolution of a target dot when an image is generated is three times extended in the horizontal direction (primary scanning direction). However, although the lookup table is amended so that an image is generated with a target dot having the resolution three times higher than a normal value, or although an amendment is made by generating an image having the resolution equal to or higher than one time and lower than three times, the quality of the image can be improved. Furthermore, if the resolution of an image generated by the image generation unit 1104 can be extended in the vertical direction (secondary scanning direction), then the lookup table can be amended so that the resolution of the target dot is extended in the vertical direction, thereby improving the quality of an image.

Figure 15:
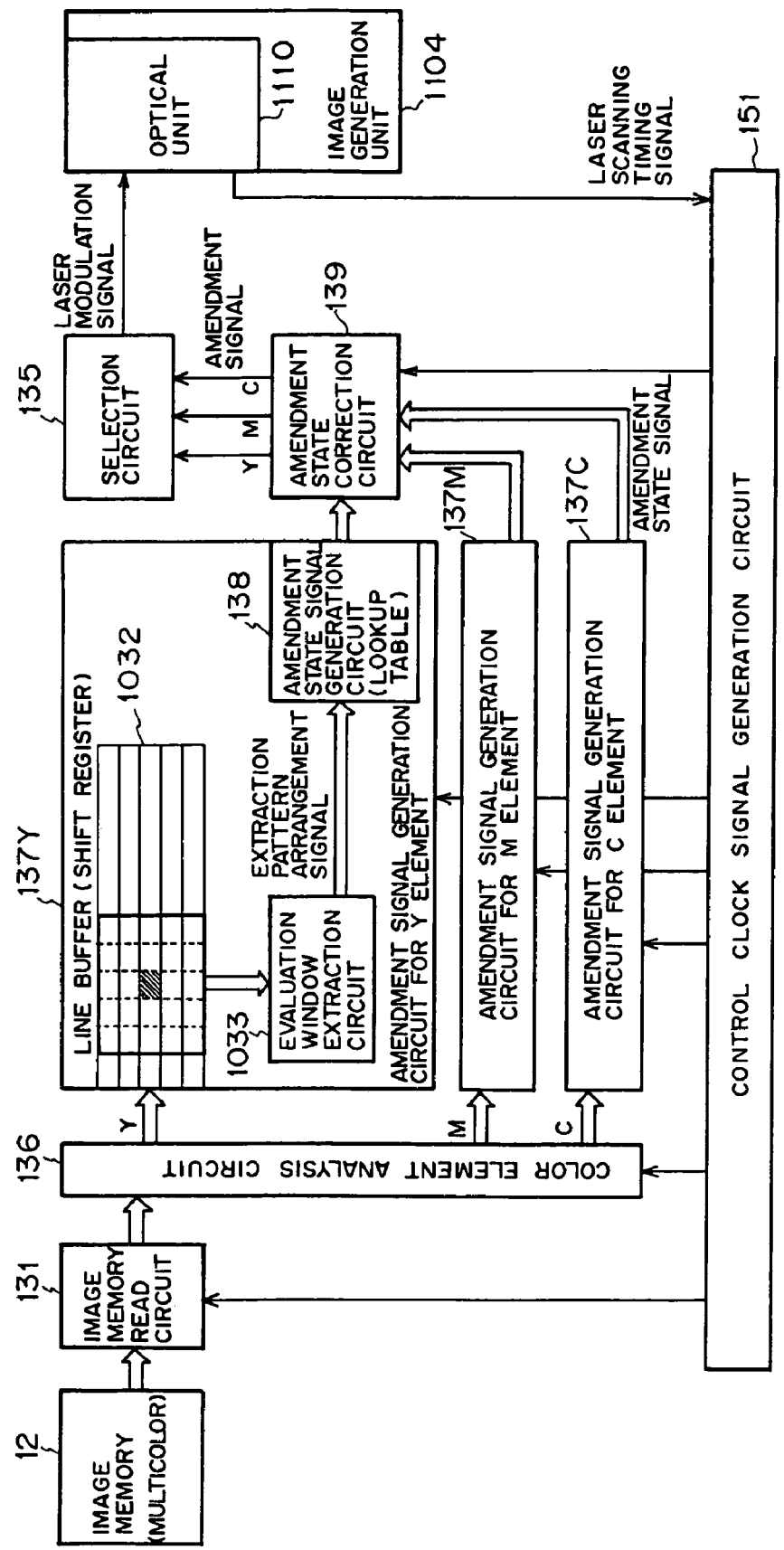
FIG. 15 is a block diagram of the second example of the detailed circuit configuration centering on the image quality improvement/laser modulation signal generation circuit in the color laser beam printer shown in FIG. 8.

FIG. 15 is a block diagram showing the second example of the detailed configuration of the circuit centering on the image quality improvement/laser modulation signal generation circuit 13 in a color laser beam printer shown in FIG. 9.

In FIG. 15, the components also appearing in the first example shown in FIG. 10 are assigned the same unit numbers.

In FIG. 15, the bit map data of a printing image is preliminarily developed and stored in the image memory 12 as in the first example shown in FIG. 10. Furthermore, each piece of pixel data in the bit map data of a printing image is the same as the data in the above described first example. That is, the data is multicolor data represented by 3 bits of R (red), G (green), and B (blue) assigned an address corresponding to the printing position in the printing area.

Figure 16:
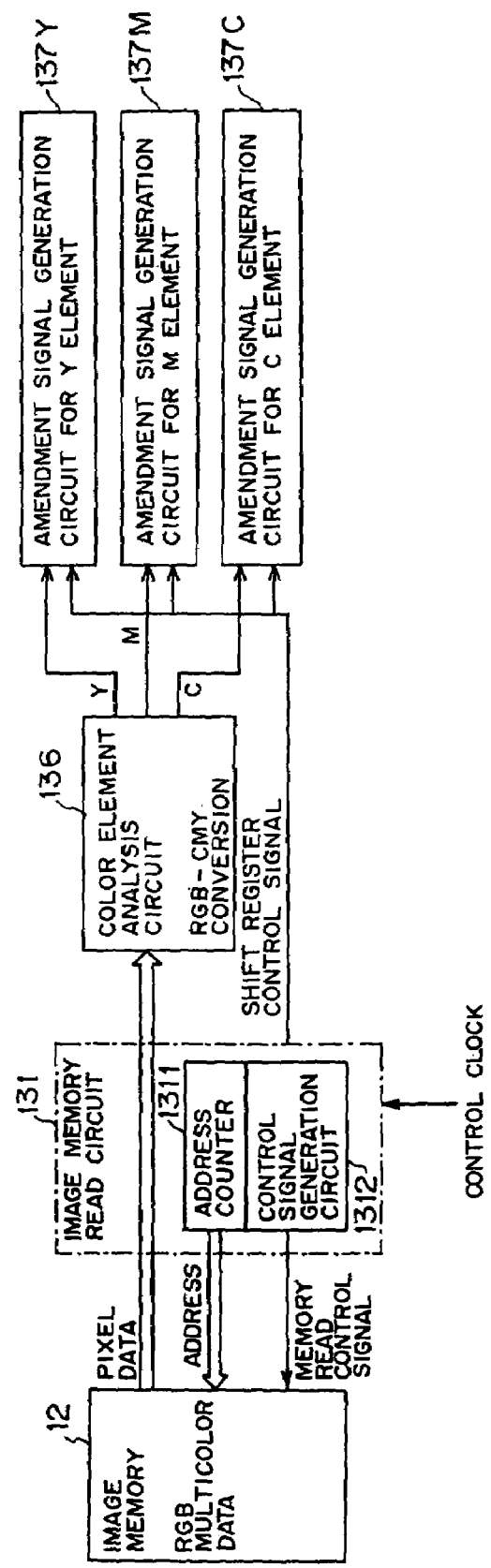
FIG. 16 shows the detailed configuration around the image memory read circuit shown in FIG. 15.

In addition, the image memory read circuit shown in FIG. 15 is the same as the circuit according to the first example shown in FIG. 10. FIG. 16 shows the detailed configuration around the image memory read circuit 131 shown in FIG. 15. Like the circuit shown in FIG. 11, the image memory read circuit 131 shown in FIG. 16 comprises the address counter 1311 for generating the address of pixel data read from the image memory 12; and the control signal generation circuit 1312 for outputting a control signal for control of reading data from the image memory 12, and writing data to the line buffer (1032 shown in FIG. 15) comprising shift registers provided in the three amendment signal generation circuits (137Y, 137M, 137C).

Back in FIG. 15, the multicolor image data read by the image memory read circuit 131 from the image memory 12 in synchronization with writing an image using the primary scanning line of the image generation unit 1104 is color-analyzed into the color information of the primary printing color elements for a printer, and is stored in the line buffer 1032 of an amendment signal generation circuit (137Y, 137M, 137C) for each of the primary color elements.

A color element analysis circuit 136 is a circuit for converting the pixel data of 3 RGB bits read from the image memory 12 into color elements of three colors YMC (3 bits), and converts the color information by the following equation.

$$Y=\overline{B}, M=\overline{G}, C=\overline{R}$$

The above described equation is based on the relationship of the complementary color between the color elements of RGB and the color elements of YMC. That is, the color elements of YMC are obtained by inverting the existence/non-existence of each of the color elements of RGB of the pixel data.

The amendment signal generation circuits (137Y, 137M, 137C) for respective primary color elements Y, M, and C have identical internal configurations. Therefore, FIG. 15 shows the detailed configuration of the amendment signal generation circuit 137Y only.

Figure 3:
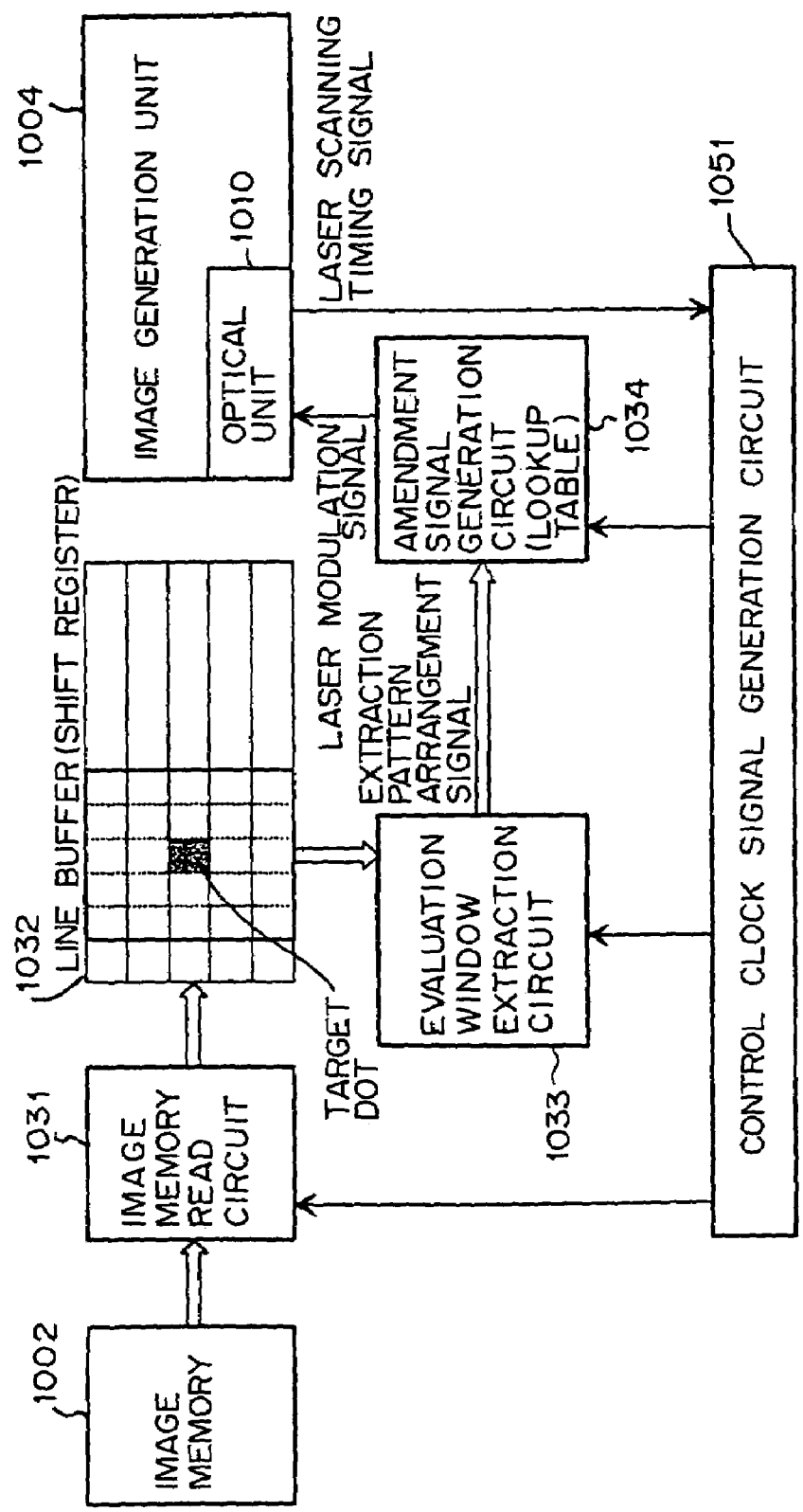
FIG. 3 shows the detailed configuration of the image quality improvement/laser modulation signal generation circuit shown in FIG. 1.

As compared with the detailed configuration of the image quality improvement/laser modulation signal generation circuit 1003 in the monochrome color laser beam printer shown in FIG. 3, the detailed configuration of the amendment signal generation circuit 137Y shown in FIG. 15 comprises the line buffer 1032 and the evaluation window extraction circuit 1033 which are the same as the components of the image quality improvement/laser modulation signal generation circuit 1003. In addition, an amendment state signal generation circuit 138 shown in FIG. 15 is the same as the amendment signal generation circuit 1034 shown in FIG. 17 although they have different names. Thus, the components of the image quality improvement/laser modulation signal generation circuit in the monochrome printer can be used as the amendment signal generation circuit (137Y, 137M, 137C) for respective primary color elements Y, M, and C in the color printer.

In FIG. 15, the line buffer 1032 in each of the amendment signal generation circuits (137Y, 137M, 137C) updates data in synchronization with writing an image using the primary scanning line of the image generation unit 1104.

The evaluation window extraction circuit 1033 in each of the amendment signal generation circuits (137Y, 137M, 137C) moves the evaluation window in synchronization with writing dots in the image generation unit 1104, extracts a target dot contained in the evaluation window, and data in a predetermined area around the target dot from the line buffer 1032, and outputs an extraction pattern arrangement signal indicating the dot arrangement in the extracted area.

Figure 4:
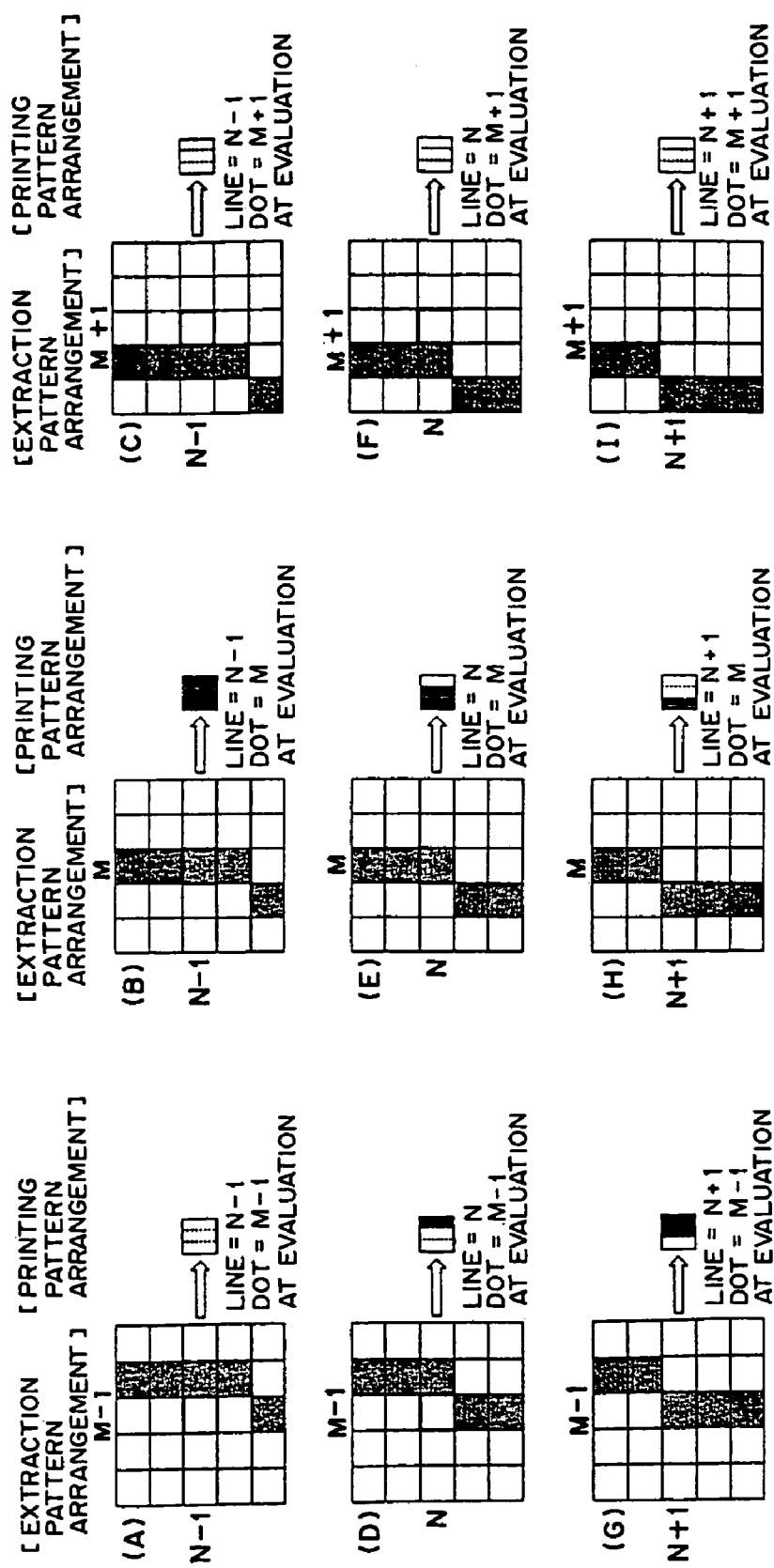
FIG. 4 shows an example of the correspondence between the extraction pattern arrangement and the arrangement pattern of the target dot in the laser beam printer shown in FIG. 1.

The extraction pattern arrangement signal output from the evaluation window extraction circuit 1033 is input to the amendment state signal generation circuit 138. The amendment state signal generation circuit 138, which is the same as the amendment signal generation circuit 1034, outputs an amendment state signal for each primary color plane based on a predetermined rule, that is, the correspondence between the extraction pattern arrangement signal and the arrangement pattern of the dots printed at corresponding positions on a printing medium of a target dot as shown in FIG. 4.

An amendment state correction circuit 139 receives an amendment state signal containing the states before and after the amendment of each dot output from the amendment signal generation circuit (137Y, 137M, 137C) for each of the primary color elements, performs a logic operation according to a predetermined rule described later, and outputs an amendment signal applied to each of the primary printing colors Y, M, and C.

Since an amendment state signal for the plane of each of the primary color elements is input to the amendment state correction circuit 139, the amendment signal after the correction to be applied to the plane of each of the primary printing colors Y, M, and C can be output regardless of the image generation unit 1104 generating an image for each color. In this case, for example, memory temporarily storing an amendment signal can be added to transmit the amendment signal to the image generation unit 1104 depending on the process of the image generation unit 1104 generating an image for each color.

The selection circuit 135 is controlled to select an amendment signal for use in generating an image of primary color planes by the image generation unit 1104 from the amendment signal applied to the plane of each of the primary colors Y, M, and C by another block (not shown in the attached drawings) in the control circuit 15 shown in FIG. 9. The selected amendment signal is output as a laser modulation signal to the optical unit 1110 in the image generation unit 1104.

In the amendment state signal generation circuit 138 in the amendment signal generation circuit (137Y, 137M, 137C) for each of the primary printing color elements, the same amendment state correction rule is applied to each of the primary color planes. As described above, according to the present embodiment, the amendment state signal generation circuit 138 is the same as the amendment signal generation circuit 1034 shown in FIG. 3, and applies the rules of generating an amendment signal consistently generated as effective in a monochrome printer when an amendment state correction signal for each plane is generated.

Then, the amendment state correction circuit 139 receives an amendment state signal containing a state signal after an amendment to a target dot for each plane as an output of the amendment state signal generation circuit 138, and a state signal of the target dot before the amendment in each plane and the adjacent dots to the right and left of the target dot.

The amendment state correction circuit 139 determines whether or not an amendment to the target dot can be made according to the amendment state signal of each plane. Practically, the amendment state correction circuit 139 outputs a state signal before the amendment of the target dot as a corrected amendment signal for the target dot when a color not appearing before the amendment appears in the color indicated by the input state signal after the amendment to the target dot relating to the target dot and the adjacent dots to the right and left of the target dot in 1 line containing the target dot. Otherwise, it outputs a state signal after the amendment of the target dot as a corrected amendment signal for the target dot. As a result, a color not appearing in the original image data can be prevented from appearing in the printed image.

Figure 17:
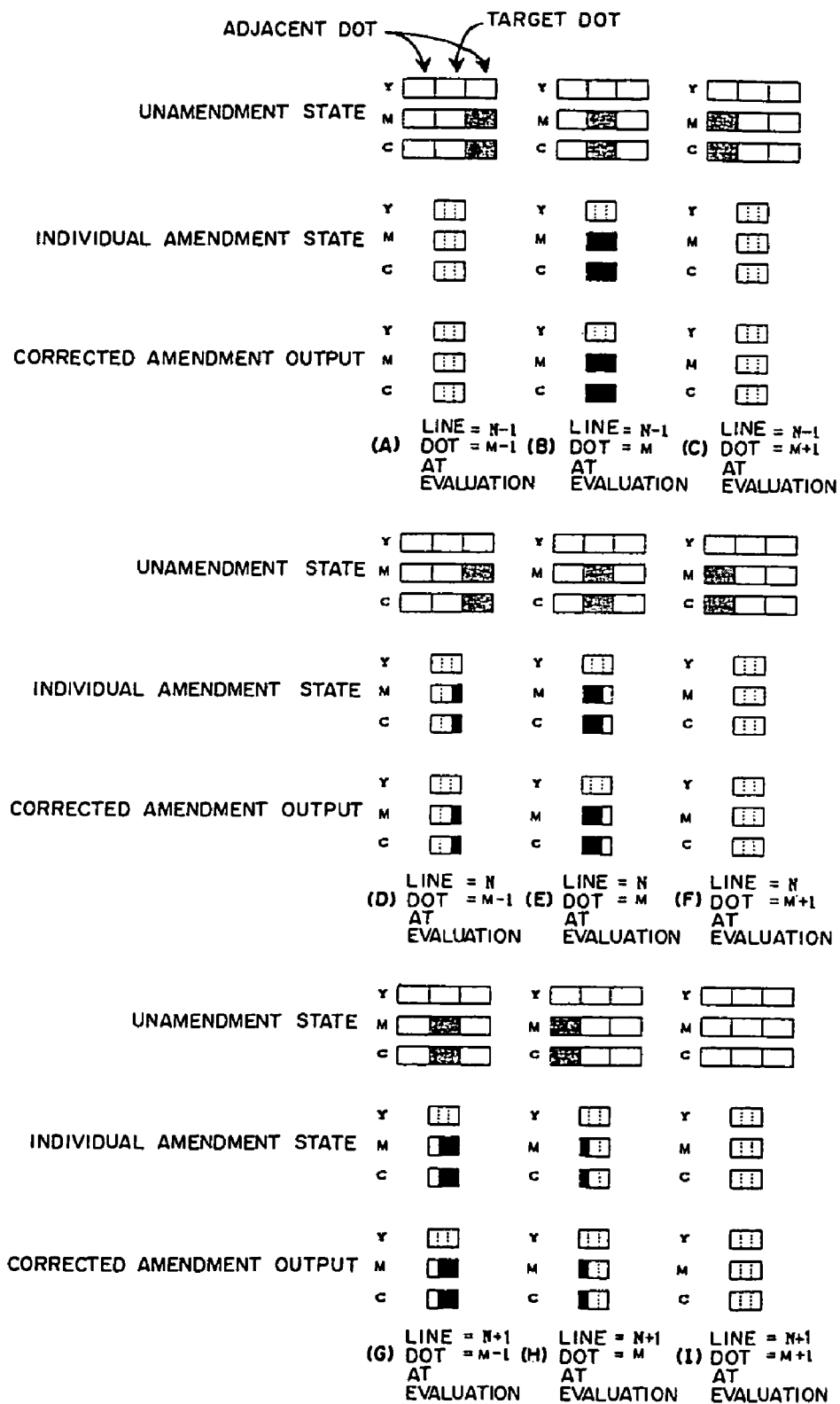
FIG. 17 shows an example (1) of the correspondence among the state of a target dot and its adjacent dots before an amendment, the individual state after an amendment to a target dot, and the state after a corrected amendment.
Figure 18:
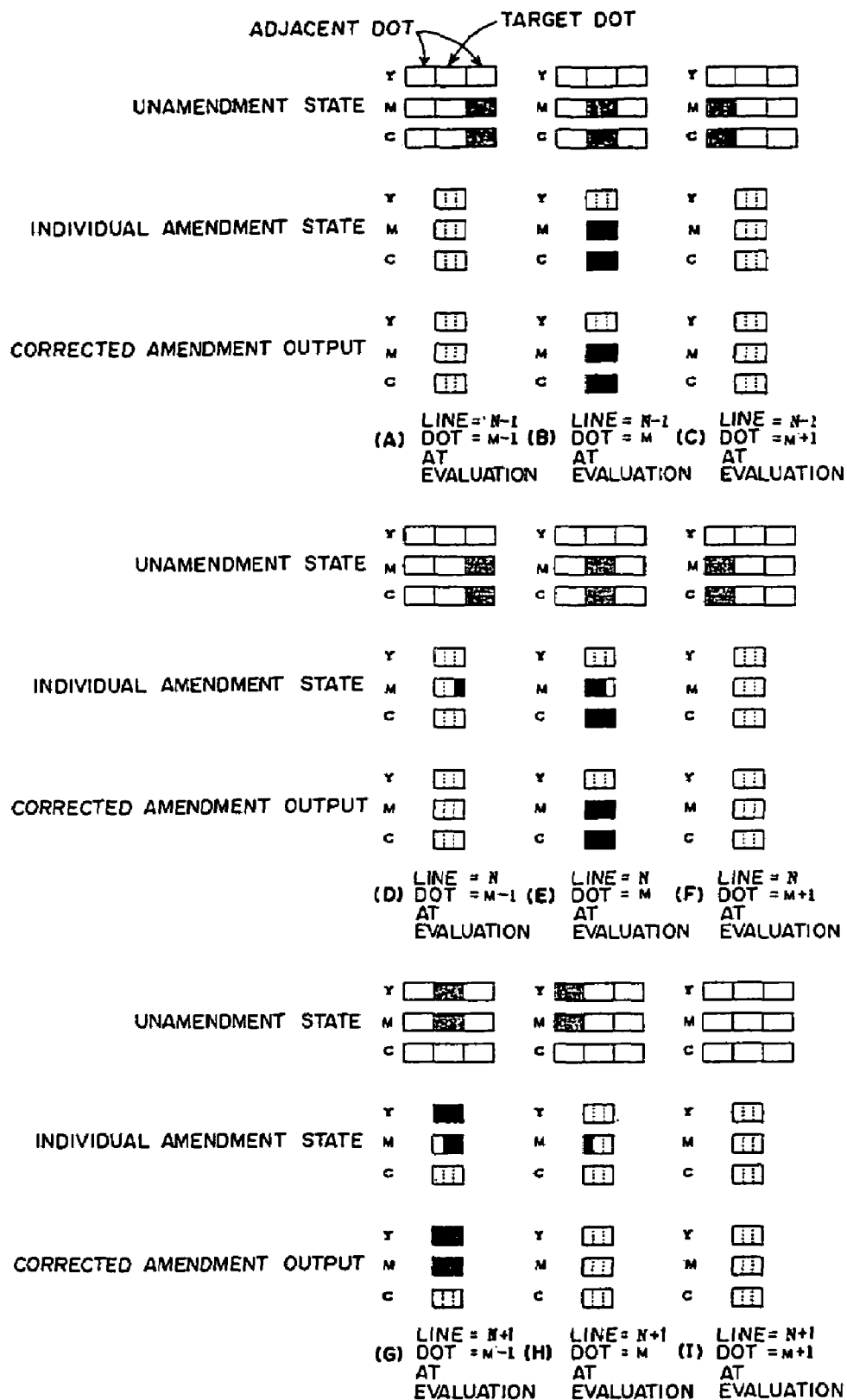
FIG. 18 shows an example (2) of the correspondence among the state of a target dot and its adjacent dots before an amendment, the individual state after an amendment to a target dot, and the state after a corrected amendment.

FIGS. 17 and 18 shows an example of the correspondence among the state of the target dot and the adjacent dots indicated by each extraction pattern arrangement signal in the amendment signal generation circuit (137Y, 137M, 137C) of each primary printing color element; the state of the target dot after the individual amendment for each primary printing color element performed by the amendment state signal generation circuit 138; and the state of the target dot indicated by the corrected amendment signal output by the amendment state correction circuit 139.

As described above, since the amendment state signal generation circuit 138 is the same as the amendment signal generation circuit 1034 shown in FIG. 3, the input/output operation of the amendment state signal generation circuit 138 according to the lookup table refer to the correspondence between the extraction pattern arrangement signal and the arrangement pattern of the dots corresponding to the target dot printed on the printing medium as shown in FIG. 4 for each primary printing color element. Therefore, when a signal indicating the color of the dots as an 'unamended state' first in each of (A) through (I) in FIGS. 17 and 18 is input, the amendment state signal generation circuit 138 outputs an amendment signal such that the image generation unit 1104 can generate an image with the target dot for each primary printing color element indicated as an 'individual amendment state' second in each of (A) through (I).

When the amendment state correction circuit 139 receives a signal indicating the color of the target dot and the adjacent dots as the 'unamended state' first shown in each of (A) through (I) shown in FIGS. 17 and 18; and an amendment signal about the target dot indicated as an 'individual amendment state' second shown in each of (A) through (I), a corrected amendment signal indicated as a 'corrected amendment output' last in each of (A) through (I) is output for each target dot of each primary color plane of Y, M, and C.

FIG. 17 shows an example of the correspondence between the state of the obtained target dot and the state of the adjacent dots relating to the dot at the position of line=N and dot=M, and all dots adjacent to the target dot when the image data containing only one color B (blue) as shown in FIG. 7 (A) is input. FIG. 18 shows an example of the correspondence between the state of the obtained target dot and the state of the adjacent dots relating to the dot at the position of line=N and dot=M, and all dots adjacent to the target dot when the image data containing two colors B (blue) and R (red) as shown in FIG. 8 (A) is input.

The operations of the amendment state correction circuit 139 is described below furthermore in detail by referring to FIG. 19.

Figure 19:
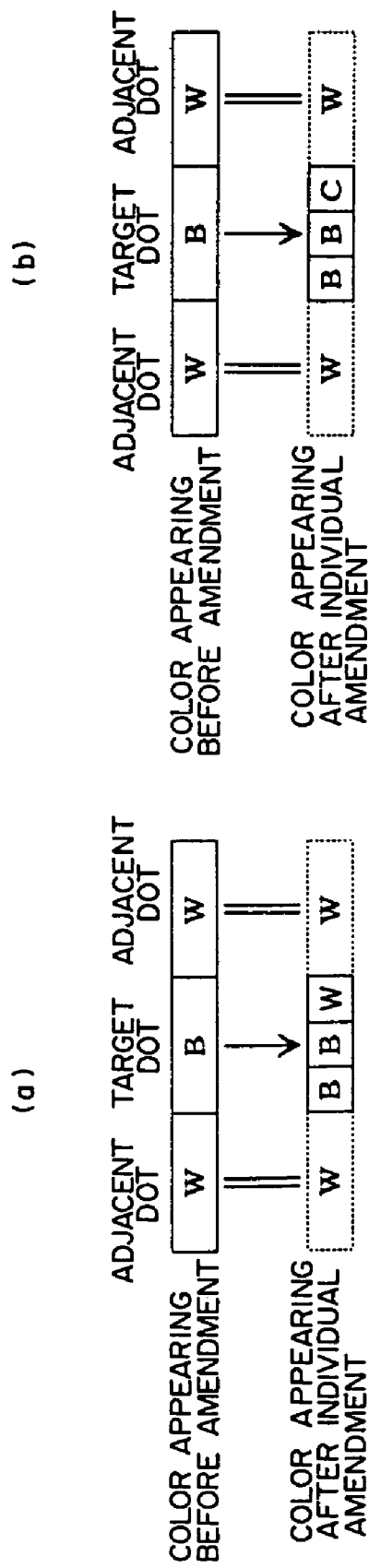
FIG. 19 shows the operation of the amendment state correction circuit.

(a) and (b) in FIG. 19 show an example of the correspondence between the unamended state and the amended state obtained by the amendment state signal generation circuit 138 as a result of the color combination of the primary printing color elements Y, M, and C based on the case where the target dot is positioned at line=N and dot=M in (A) shown in FIGS. 7 and 8, that is, shown by (E) in FIGS. 17 and 18. In FIG. 19, W indicates white, B indicates blue as a color combination of M (magenta) and C (cyan), and C indicates cyan.

In FIG. 19, (a) indicates that only the colors contained in the colors (B and W) appearing in the unamended target dot or adjacent dots appear as combined colors after the individual amendment to the target dot. On the other hand, (b)

indicates that the color C not contained in the colors (B and W) appearing in the unamended target dot or adjacent dots appear as combined colors after the individual amendment to the target dot.

The amendment state correction circuit 139 determines whether or not a color not appearing in the unamended target dot or the target dots has appeared in the combined color after the individual amendment of the target dot. If a color not appearing before the amendment has appeared in the combined color after the amendment as indicated by (b) shown in FIG. 19, then the amendment made by the amendment state signal generation circuit 138 is not accepted, but the original state of the unamended target dot is accepted as is, and is output as an amendment signal. The operation of the amendment state correction circuit 139 obtains the 'individual amendment state', which is an amendment result of the amendment state signal generation circuit 138, as the 'corrected amendment output' in the case shown in FIG. 17 (E). In the case shown in FIG. 18 (E), the 'unamended state' of the target dot input to the amendment state signal generation circuit 138 is obtained as the 'corrected amendment output'.

A printing process is performed for each color on the dot arrangement processed by the smoothing method for each color as shown in FIG. 7 (C) by the circuit operation performed by the amendment state correction circuit 139, and the printing result as shown in FIG. 7 (D) can be obtained in the case shown in FIG. 17, that is, when image data containing only one color B (blue) as shown in FIG. 7 (A) is input. The printing process as shown in FIG. 8 (C) is not performed on the dot arrangement, but the printing process is performed for each color on the dot arrangement not processed by the smoothing method as shown in FIG. 8 (B), and unamended original image data as shown in FIG. 8 (A) can be obtained as a printing result in the case shown in FIG. 18, that is, when image data containing two colors B (blue) and R (red) as shown in FIG. 8 (A) is input.

As described above, with the second configuration shown in FIG. 15 is adopted for the image quality improvement/laser modulation signal generation circuit 13 shown in FIG. 9, the smoothing method is used when the printing data has a monochrome pattern, and is not used when the printing data has the pattern in which adjacent different colors are represented using the same primary color, thereby improving the quality of an image. As a result, the image can be printed with the quality improved, and with the color not appearing in the original data, but appearing as shown in FIG. 8 (D), successfully suppressed.

Figure 20:
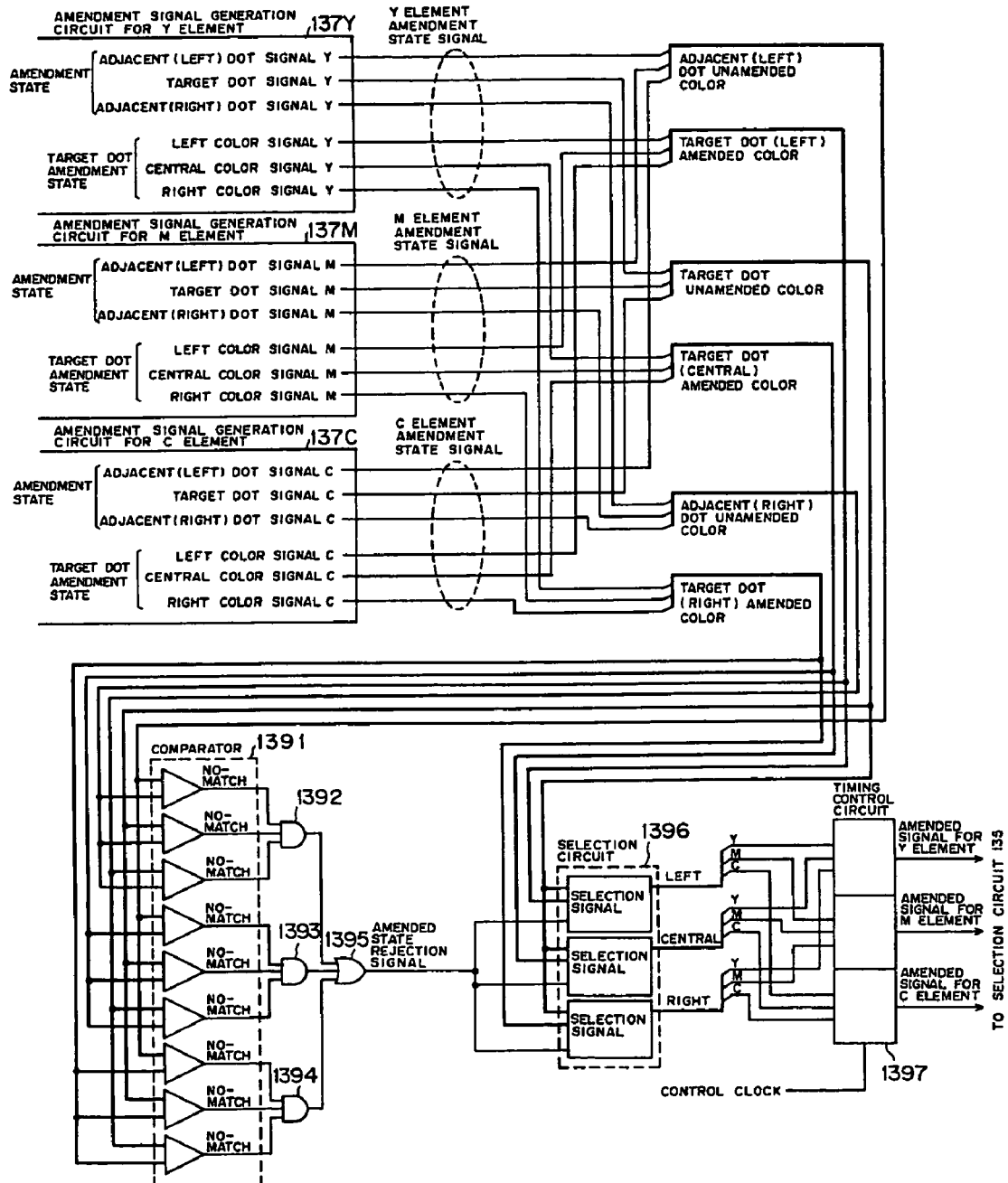
FIG. 20 shows the detailed configuration of the amendment state correction circuit.

FIG. 20 shows the detailed configuration of the amendment state correction circuit 139 for realizing the above described operations. In FIG. 20, the amendment state correction circuit 139 comprises a comparator 1391, AND circuits (1392, 1393, 1394), an OR circuit 1395, a selection circuit 1396, and a timing control circuit 1397.

A signal indicating the color of a target dot and its adjacent dots before an amendment is made to them, and a signal indicating the state of the target dot after the amendment made by the amendment state signal generation circuit 138 are output from the amendment signal generation circuit (137Y, 137M, 137C) for each primary printing color element. As signals indicating the state of the target dot after the amendment, three types of signals, that is, a left color signal indicating the color of the left portion of the target dot after the amendment, a central color signal indicating the color of the central portion after the amendment, and a right color signal indicating the color of the right portion of the target dot after the amendment, are output for each primary printing color element.

Each signal output from the amendment signal generation circuit (137Y, 137M, 137C) is first input to the comparator 1391, and it is determined whether or not the color indicated by the left color signal, the central color signal, or the right color signal of an amended target dot matches the color indicated by the signal of an unamended target dot or adjacent dot. If they do not match, a corresponding output of the comparator 1391 is changed from L (low level) to H (high level).

Each output of the comparator 1391 is input to each of the AND circuits (1392, 1393, 1394). If the color of the left portion of the amended target dot does not match any color of the unamended target dot or adjacent dots, then the output of the AND circuit 1392 is changed from L to H. If the color of the central portion of the amended target dot does not match any color of the unamended target dot or adjacent dots, then the output of the AND circuit 1393 is changed from L to H. If the color of the right portion of the amended target dot does not match any color of the unamended target dot or adjacent dots, then the output of the AND circuit 1394 is changed from L to H.

the outputs of the AND circuits (1392, 1393, 1394) are input to the OR circuit 1395. Therefore, if any of the outputs of the AND circuits (1392, 1393, 1394) is changed from L to H, then the output of the OR circuit 1395 indicates H. That is, if the output of the OR circuit 1395 indicates H, it proves that the color not appearing in the unamended target dot or adjacent dots has appeared in the target dot after the amendment. The signal is hereinafter referred to as an 'amended state rejection signal'.

Depending on the logic of the amended state rejection signal, the selection circuit 1396 passes and outputs the three types of signals of an amended target dot, that is, the left color signal, the central color signal, and the right color signal, for each of the primary printing color elements. When the logic indicates H, the signal indicating the color of the unamended target dot is passed and output for each of the primary printing color elements.

The timing control circuit 1397 outputs a corrected amendment signal for a target dot for each of the primary printing color elements from the selection circuit 1396 in synchronization with the control clock received from the control clock signal generation circuit 151, and the output is transmitted to the selection circuit 135.

The circuit shown in FIG. 20 functions as the amendment state correction circuit 139 by each of the units operating as described above.

In the second example of the detailed configuration of the image quality improvement/laser modulation signal generation circuit 13 shown in FIG. 15, the amendment signal generation circuits (137Y, 137M, 137C) for each of the primary printing color planes can be the same hardware. Therefore, the circuit can be designed to perform a time-division process using a high-speed element so that the components of the amendment signal generation circuits (137Y, 137M, 137C) excluding the line buffer 1032 can be shared.

In addition, in the first and second examples of the detailed configurations of the image quality improvement/laser modulation signal generation circuit 13 shown in FIGS. 10 and 15, the printing data input from an upper computer system, etc. is assumed to be developed on the image memory 12 as the image data containing the color information. It is also assumed that the data which is color-analyzed into the planes of primary printing colors can be developed on the image memory 12. In this case, in the first example shown in FIG. 10, the data containing the color information can be transmitted to the component at the subsequent stage by combining colors when the image memory read circuit 131 reads color-analyzed image data and stores the data in the line buffer 132, or by providing the line buffer 132 for each of the primary color planes, and combining colors when the evaluation window extraction circuit 133 extracts the data of the target dot or the pixels at a predetermined area around the target dot from the line buffer 132, and outputs an extraction pattern arrangement signal. In the second example shown in FIG. 15, the color element analysis circuit 136 is deleted, and the printing image data already color-analyzed into primary printing color planes to be read from the image memory 12 is stored in the line buffer 1032 in the amendment signal generation circuit (137Y, 137M, 137C).

Figure 21:
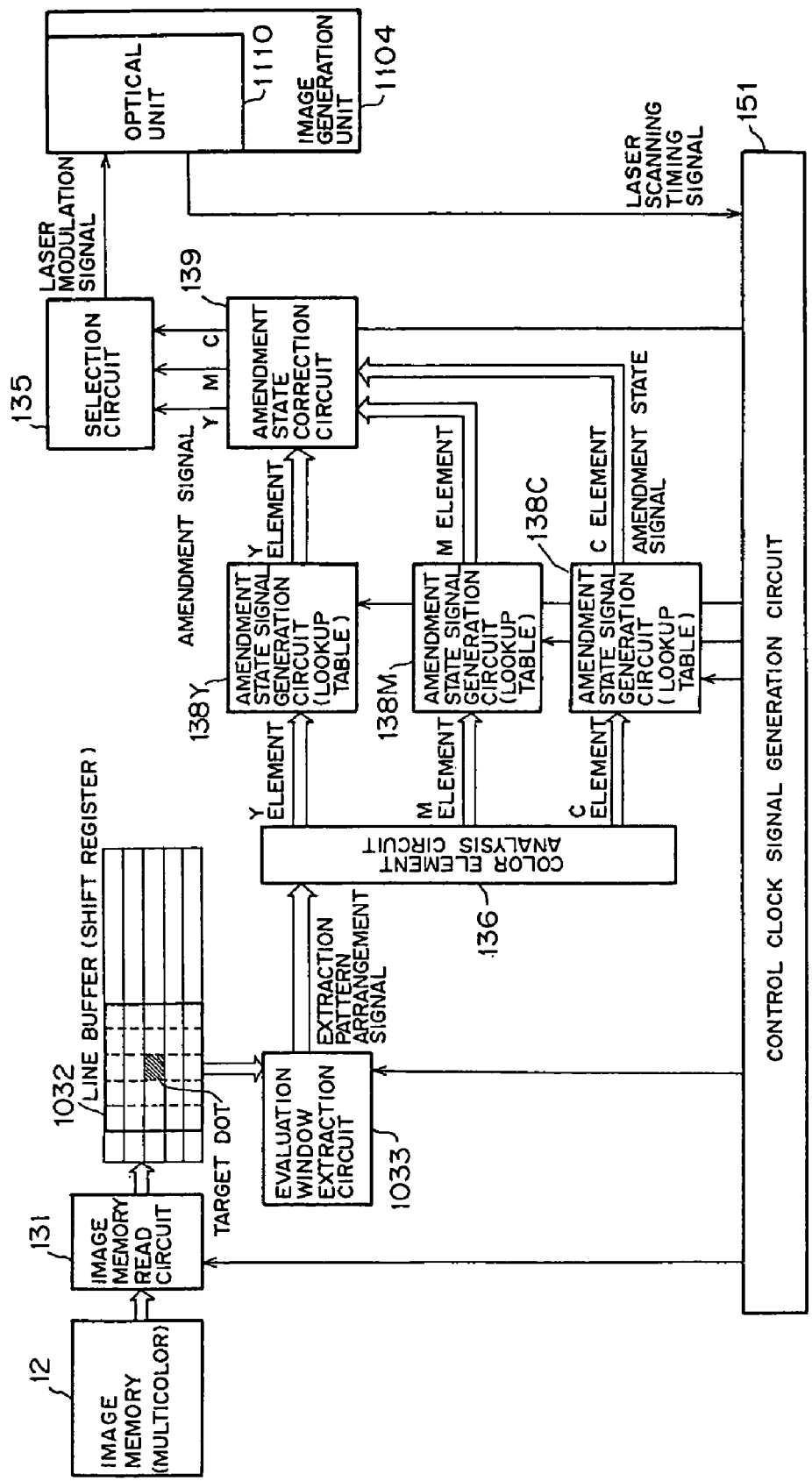
FIG. 21 is a block diagram of the third example of the detailed circuit configuration centering on the image quality improvement/laser modulation signal generation circuit in the color laser beam printer shown in FIG. 9.

FIG. 21 is a block diagram of the third example of the detailed circuit configuration centering on the image quality improvement/laser modulation signal generation circuit 13 in the color laser beam printer shown in FIG. 9.

In FIG. 21, the units also used in the second example shown in FIG. 15 are assigned the same unit numbers.

In the second example shown in FIG. 15, the multicolor image data read from the image memory 12 is converted into color elements of three colors Y, M, and C (3 bits) by the color element analysis circuit 136, stored in the line buffer 1032 in the amendment signal generation circuit (137Y, 137M, 137C) for each of the primary printing color elements, and then processed in the above described image quality improving process.

On the other hand, in the third example shown in FIG. 21, the multicolor image data read from the image memory 12 is not color-analyzed, and stored in the line buffer 1032. Then, the evaluation window extraction circuit 1033 extracts the data of the target dot and a predetermined area around the target dot from the line buffer 1032, and outputs the extraction pattern arrangement signal indicating the extracted dot arrangement and colors of the area. Then, the color element analysis circuit 136 analyzes the extraction pattern arrangement signal into the signal of each of the primary printing color elements Y, M, and C, and transmits the signal to the amendment state signal generation circuit (138Y, 138M, and 138C) of each of the primary printing color elements. The configuration of the components other than the amendment state signal generation circuit (138Y, 138M, 138C) is the same as the configuration of the second example shown in FIG. 15, and therefore, the method of improving the quality of an image used in the third example is all the same as the method used in the above described second example.

With the configuration of the above described third example, as compared with the second example in which the line buffer 1032 is required for each of the primary printing colors, the size of the line buffer 1032 can be reduced because image data is stored in the form of multicolor data which is less redundant in dot arrangement information than the data analyzed into each of the primary printing colors.

With the above described second or third example, the color element analysis circuit 136 can determine whether or not input image data contains a monochrome dot pattern when the image data is analyzed into a signal of each of the primary printing color elements Y, M, and C. Therefore, it is possible for the color element analysis circuit 136 to make determination as described above, and make an amendment by the amendment signal generation circuit (137Y, 137M, 137C or 138Y, 138M, 138C) only when input image data contains a monochrome dot pattern to generate an image of a target dot, and otherwise generate an image using unamended data of the target dot. With the configuration, the amendment state correction circuit 139 is not required, and an insignificant amendment to be made by the amendment state correction circuit 139 can be suppressed, thereby improving the efficiency of the entire process.

Figure 6:
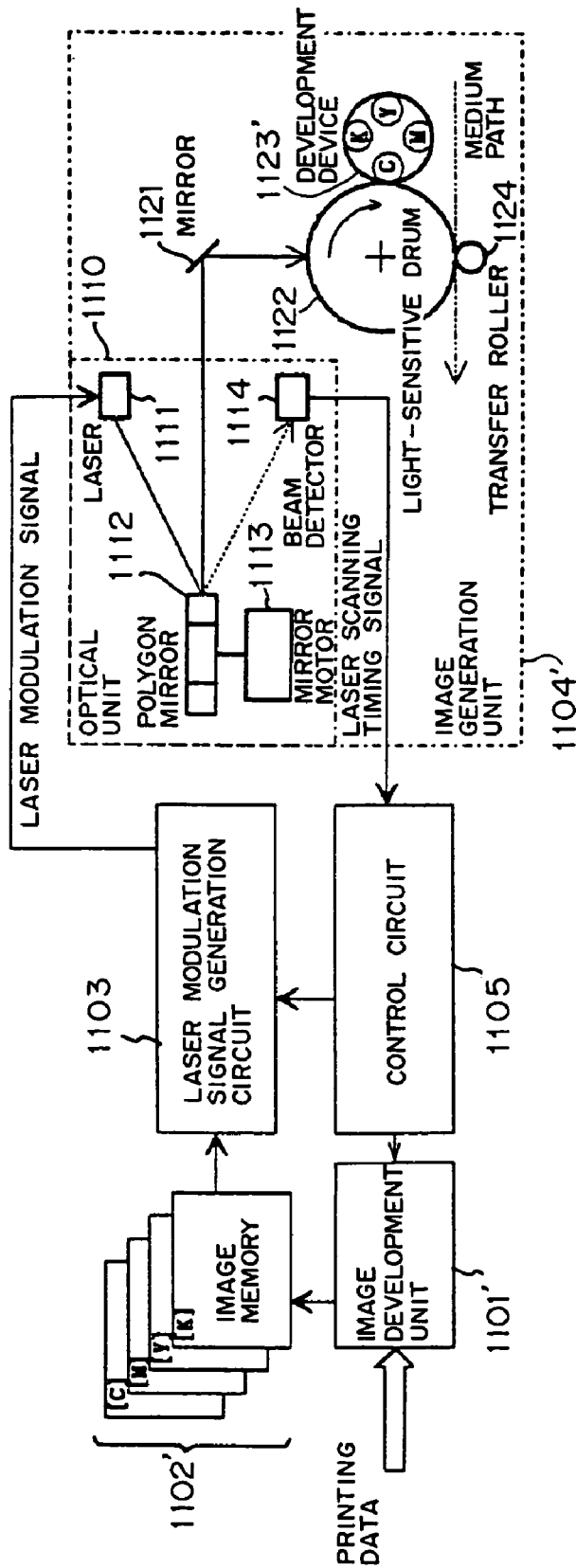
FIG. 6 shows an example of the configuration of the conventional color laser beam printer using the toner in four colors Y, M, C, and K.
Figure 22:
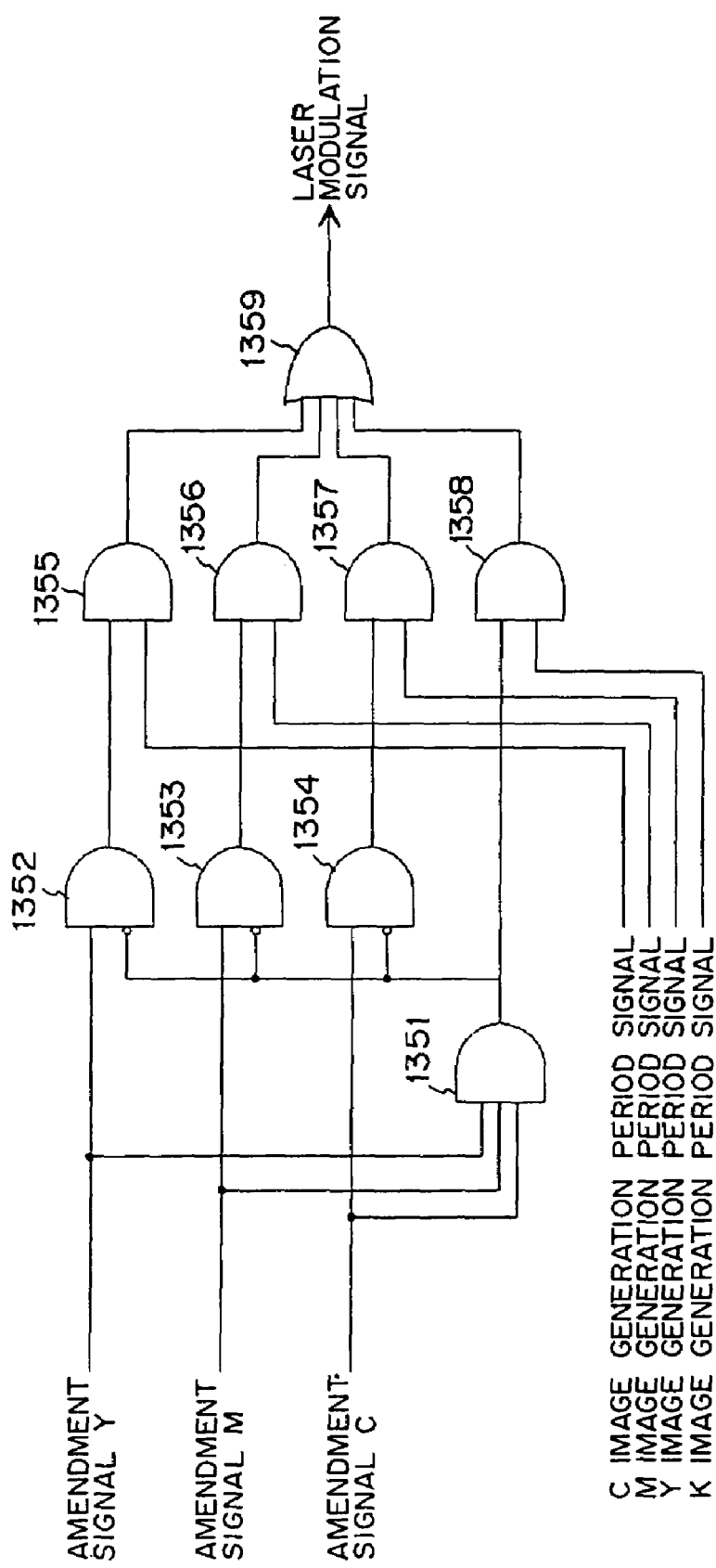
FIG. 22 shows an example of the configuration of the selection circuit applied to the color printer in which four colors of Y, C, M, and K are overlapped.

The embodiments of the present invention described above related to the color printers in which images of three colors Y, M, and C are overlapped. However, the present invention can be easily applied to the color printer in which four colors Y, M, C, and K are overlapped as shown in FIG. 6. As described above, in the first through third examples with the detailed circuit configuration of the image quality improvement/laser modulation signal generation circuit 13 shown in FIGS. 10, 15, and 21, amendment signals of three colors Y, M, and C can be simultaneously obtained. Therefore, in the selection circuit 135 to which the three color amendment signals are input, the state in which the three colors Y, M, and C are overlapped into K (black) can be obtained. Therefore, in the state of K, the corresponding amendment signal can be processed as the amendment signal of the image K to apply the present invention to the color printer shown in FIG. 6. FIG. 22 shows an example of the configuration of the selection circuit 135 applied to the color printer in which four colors Y, M, C, and K are overlapped and an amendment signal of an image K can be extracted.

The amendment signals of the three colors Y, M, and C are first input to an AND circuit 1351 to obtain a logic product. An output resultant signal can be used as an amendment signal of K. A part of the amendment signal is inverted in logic to obtain logic products with respective amendment signals of the three colors Y, M, and C by AND circuits (1352, 1353, 1354), thereby generating amendment signals respectively for Y, M, and C which are applicable in the color printer for realizing the multicolor image printing process by overlapping the monochrome images of the four colors Y, M, C, and K.

Thus, the circuit configuration with which the amendment signals of the four colors Y, M, C, and K are obtained is otherwise the same as the configuration of the selection circuit 135 (FIGS. 10, 15, and 21) for use in the color printer for realizing the multicolor image printing process by overlapping the monochrome images of the three colors Y, M, and C. That is, the AND circuits (1355, 1356, 1357, 1358) selects the amendment signal for use in generating an image of primary color planes by the image generation unit 1104 from the amendment signals of the four colors Y, M, C, and K according to a color image generation period signal for each of the four colors Y, M, C, and K generated by a control unit (not shown in the attached drawings). The selected amendment signal is output as a laser modulation signal through an OR circuit 1359.

With the above described configuration, the selection circuit 135 can be applied to any of the cases shown in FIGS. 10, 15, and 21 to embody the present invention in the color printer in which the four colors Y, M, C, and K are overlapped.

As described above, in any of the embodiments of the present invention, the quality of images can be improved by reducing the jags generated on the printed characters and drawings in the multicolor image printing device (color printer) used as an output device of a computer system. It is obvious that the components described above are not limited to be mounted in the same housing. For example, the image improvement can be realized according to the present invention using an upper computer system, etc., and the execution result, that is, the amended image data, can be transferred to a color printer device to perform a printing process.

The embodiments with a color laser beam printer are described above, but the present invention can also be realized in any color printer devices in other systems such as an LED printer, a liquid crystal display printer, a heat transfer printer, an ink jet printer, etc. Furthermore, it can be supplied not only to printer devices, but also to image display devices, etc. such as a display device, etc.

The present invention can also be applied not only to the smoothing method as an image quality improving method, but also to a method, for example, of emphasizing the outline of a multicolor image to improve the quality of an image. In this case, it is determined whether or not an outline should be emphasized using information about monochrome images forming a multicolor image, and also using information about other monochrome images than those forming the multicolor image.

The above described present invention has the following effects.

According to the first embodiment of the present invention, in the multicolor image generation device for generating a multicolor image indicated by the image data by overlapping monochrome images of different colors generated according to the image data, a signal for generation of a monochrome image is amended according to the information about the monochrome image indicated by the image data and according to the information about the monochrome image of another color indicated by the image data. With the configuration, the amendment made to the monochrome image to improve the quality of the multicolor image can be made not only according to the information about the indicated monochrome image, but also according to the information about the monochrome image of another color forming part of the multicolor image. As a result, a monochrome image can be corrected such that a color not appearing in the original image data cannot appear in the resultant multicolor image.

According to the second embodiment, in the multicolor image generation device for generating a multicolor image indicated by the image data by overlapping monochrome images of different colors generated according to the image data, a signal for generation of a monochrome image is amended according to the information about the monochrome image indicated by the image data. The signal for generation of the amended monochrome image is corrected based on the amendment result of the signal for generation of a monochrome image of another color. With the configuration, the amendment made to the monochrome image to improve the quality of the multicolor image can be corrected based on the amendment result of the monochrome image of the other color forming part of the multicolor image. As a result, the amendment result of a monochrome image can be corrected such that a color not appearing in the original image data cannot appear in the resultant multicolor image.

Thus, in any embodiments of the present invention, the quality of a multicolor image generated from image data can be more effectively improved than the conventional technology.

What is claimed is:

1. An apparatus generating a multicolor image indicated by image data by overlapping monochrome images of different colors according to the image data, comprising:
   an amendment unit generating amended signals, one amended signal for each of the different colors, wherein each amended signal is amended based on information in the image data about the monochrome image for one of the different colors and information in the image data about the monochrome image of another of the different colors; and
   an image generation unit generating the multicolor images by generating the monochrome images according to the amended signals, and overlapping the monochrome images,
   wherein said amendment unit amends the signal based on a correspondence in color and arrangement between pixels forming the multicolor image indicated by the image data.

2. The apparatus according to claim 1, wherein said amendment unit amends the signal such that the arrangement of pixels forming the monochrome image can be changed.

3. The apparatus according to claim 1, further comprising an extraction unit extracting partial image data indicating a part of an image indicated by the image data from the image data, wherein
   said amendment unit amends the signal according to the information contained in the partial image data.

4. The apparatus according to claim 3, wherein
   said extraction unit extracts the partial image data containing a pixel forming a monochrome image generated by said image generation unit and pixels around the pixel.

5. The apparatus according to claim 1, further comprising a selection unit selecting a signal for use by said image generation unit in generating the monochrome image about each color from among the amended signals.

6. The apparatus according to claim 1, wherein
   a monochrome image forming part of the multicolor image can be a black monochrome image, and
   said apparatus further comprises a generation unit generating a signal for generation of the black monochrome image from a signal for generation of a monochrome image of another color amended by said amendment unit.

7. An apparatus generating a multicolor image indicated by image data by overlapping monochrome images of different colors according to the image data, comprising:
   amendment means for generating amended signals, one amended signal for each of the different colors, wherein each amended signal is amended based on information in the image data about the monochrome image for one of the different colors and information in the image data about the monochrome image of another of the different colors; and
   image generation means for generating the multicolor image by generating the monochrome images according to the amended signals, and overlapping the monochrome images,
   wherein said amendment means amends the signal based on a correspondence in color and arrangement between pixels forming the multicolor images indicated by the image data.

8. An apparatus generating a multicolor image indicated by image data by overlapping monochrome images of different colors according to the image data, comprising:
   an amendment unit amending a signal for generation of a monochrome image according to information about the monochrome image contained in the image data; and
   a correction unit correcting the signal amended by said amendment unit according to an amendment result of a signal for generation of a monochrome image of another color, wherein said correcting unit corrects the signal based on a correspondence in color and arrangement between pixels forming a multicolor image generated according to the signal amended by said amendment unit.

9. The apparatus according to claim 8, wherein said amendment unit is provided for each signal for generation of a monochrome image of a different color forming part of the multicolor image, and each amendment unit amends the signal according to the same rule.

10. The apparatus according to claim 9, wherein said amendment unit amends the signal such that the arrangement of pixels forming the monochrome image can be changed.

11. The apparatus according to claim 8, wherein said correction unit corrects the signal amended by said amendment unit back to an unamended signal.

12. The apparatus according to claim 8, further comprising
an extraction unit extracting partial image data indicating a part of an image indicated by the image data from the image data, wherein
said amendment unit amends the signal according to the information contained in the partial image data.

13. The apparatus according to claim 12, wherein said extraction unit extracts the partial image data containing a pixel forming a monochrome image generated by the apparatus and pixels around the pixel.

14. The apparatus according to claim 8, further comprising
a selection unit selecting a signal for generation of a monochrome image of each color by the apparatus from among signals corrected by said correction unit.

15. The apparatus according to claim 8, wherein a monochrome image forming part of the multicolor image can be a black monochrome image, and
said apparatus further comprises a generation unit generating a signal for generation of the black monochrome image from a signal for generation of a monochrome image of another color corrected by said correction unit.

16. An apparatus generating a multicolor image indicated by image data by overlapping monochrome images of different colors according to the image data, comprising:
amendment means for amending a signal for generation of a monochrome image according to information about the monochrome image contained in the image data; and
correction means for correcting the signal amended by said amendment means according to an amendment result of a signal for generation of a monochrome image of another color,
wherein said correction means corrects the signal based on a correspondence in color and arrangement between pixels forming a multicolor image generated according to the signal amended by said amendment means.

17. A method of generating a multicolor image indicated by image data by overlapping monochrome images of different colors according to the image data, comprising:
generating amended signals, one amended signal for each of the different colors, wherein each amended signal is amended based on information in the image data about the monochrome image for one of the different colors and information in the image data about the monochrome image of another of the different colors; and
generating the multicolor image by generating the monochrome images according to the amended signals, and overlapping the monochrome images,
wherein the signal is amended based on a correspondence in color and arrangement between pixels forming the multicolor image indicated by the image data.

18. A method of generating a multicolor image indicated by image data by overlapping monochrome images of different colors according to the image data, comprising:
amending a signal for generation of a monochrome image according to information about the monochrome image contained in the image data;
correcting the amended signal according to an amendment result of a signal for generation of a monochrome image of another color to produce corrected signals; and
generating the multicolor image by generating the monochrome images according to the corrected signals, and overlapping the monochrome images,
wherein the correction of the signal is based on a correspondence in color and arrangement between pixels forming a multicolor images generated according to the amended signal.

* * * * *